United States Patent [19]

Brackett

[11] Patent Number: 5,494,135
[45] Date of Patent: Feb. 27, 1996

[54] LUBRICATION SYSTEM FOR A CONJUGATE DRIVE MECHANISM

[76] Inventor: Douglas C. Brackett, 2535 Mason Oaks Dr., Valricho, Fla. 33594

[21] Appl. No.: 317,029

[22] Filed: Oct. 3, 1994

Related U.S. Application Data

[63] Continuation-in-part of Ser. No. 149,064, Nov. 8, 1993, Pat. No. 5,417,309.

[51] Int. Cl.$^6$ ..................................................... F01M 1/04
[52] U.S. Cl. .................. 184/6.5; 184/6.6; 92/138; 92/147; 74/49; 74/50; 384/2; 384/154; 123/55.7; 123/197.4
[58] Field of Search .................. 184/6.5, 6.6; 384/2, 384/154; 74/49, 50; 123/197.4, 55.5, 55.7; 92/153, 158, 72, 147

[56] References Cited

U.S. PATENT DOCUMENTS

| | | |
|---|---|---|
| 19,726 | 3/1858 | Van Doren . |
| 116,617 | 7/1871 | McCamy . |
| 130,371 | 8/1872 | Hendryx . |
| 139,499 | 6/1873 | Doolittle . |
| 283,558 | 8/1883 | Baumgarten . |
| 347,644 | 8/1886 | Salmon . |
| 410,432 | 9/1889 | McKaig . |
| 508,387 | 11/1893 | Humphries . |
| 637,450 | 11/1899 | Doolittle . |
| 671,583 | 4/1901 | Carmack . |
| 735,743 | 8/1903 | Fowler . |
| 762,646 | 6/1904 | Morison . |
| 813,736 | 2/1906 | Pendleton . |
| 999,220 | 8/1911 | Harmon . |
| 1,508,614 | 9/1924 | Powell . |
| 1,825,096 | 9/1931 | Schwemlein ............................ 384/154 |
| 2,121,214 | 6/1938 | Vandervoort . |
| 2,312,057 | 2/1943 | Williams . |
| 2,330,552 | 9/1943 | Brooks . |
| 2,357,247 | 8/1944 | Wilkinson . |
| 2,628,602 | 2/1953 | Butterfield . |
| 3,195,420 | 7/1965 | Johannsen ................................. 74/49 |
| 3,205,723 | 9/1965 | Erlenbach . |
| 3,365,913 | 1/1968 | Shields . |
| 3,415,138 | 12/1968 | Rumbarger et al. . |
| 3,424,022 | 1/1969 | Greenberg et al. . |
| 3,789,956 | 2/1974 | Neugebauer . |
| 3,822,607 | 7/1974 | Tharaldsen . |
| 3,945,358 | 3/1976 | Collins . |
| 4,270,395 | 6/1981 | Grundy . |
| 4,355,542 | 10/1982 | Tsutsumi et al. . |
| 4,370,901 | 2/1983 | Bolen . |
| 4,485,769 | 12/1984 | Carson . |
| 4,543,919 | 10/1985 | Carson . |
| 4,570,505 | 2/1986 | Peterson . |
| 4,573,373 | 3/1986 | Shimizu et al. . |
| 4,590,812 | 5/1986 | Brackett . |
| 4,598,672 | 7/1986 | Jayne et al. . |
| 4,658,768 | 4/1987 | Carson . |
| 4,685,342 | 8/1987 | Brackett ...................................... 74/50 |
| 4,696,201 | 9/1987 | Hattori et al. . |
| 4,741,220 | 5/1988 | Watanabe et al. . |

(List continued on next page.)

FOREIGN PATENT DOCUMENTS

| | | |
|---|---|---|
| 3607422 | 10/1987 | Germany . |
| 0241518 | 10/1986 | Japan ..................................... 384/154 |

OTHER PUBLICATIONS

International Publication No. WO 94/03740 17 Feb. 1994 Douglas C. Brackett.

*Primary Examiner*—Thomas E. Denion
*Attorney, Agent, or Firm*—Selitto & Associates

[57] ABSTRACT

A conjugate drive mechanism of a motion converter includes a conjugate driver, which is rotatably mounted on a crankpin, and a bearing conjugate, which is mounted on a linearly movable shuttle. The conjugate drive mechanism is lubricated by supplying lubricating fluid from a pressurized source to an interface between trackable profiles of the bearing conjugate and the conjugate driver. The trackable profiles, which are in continuous conjugating engagement, have equal circumferential lengths.

47 Claims, 12 Drawing Sheets

U.S. PATENT DOCUMENTS

| | | |
|---|---|---|
| 4,776,229 | 10/1988 | Zona . |
| 4,779,472 | 10/1988 | Brackett . |
| 4,856,917 | 8/1989 | Schroder et al. ............................ 384/2 |
| 4,884,536 | 12/1989 | Neale . |
| 4,905,535 | 3/1990 | Ludwig et al. . |
| 4,932,373 | 6/1990 | Carson . |
| 4,979,427 | 12/1990 | Pfeffer et al. . |
| 5,090,265 | 2/1992 | Slocum . |
| 5,259,256 | 11/1993 | Brackett . |

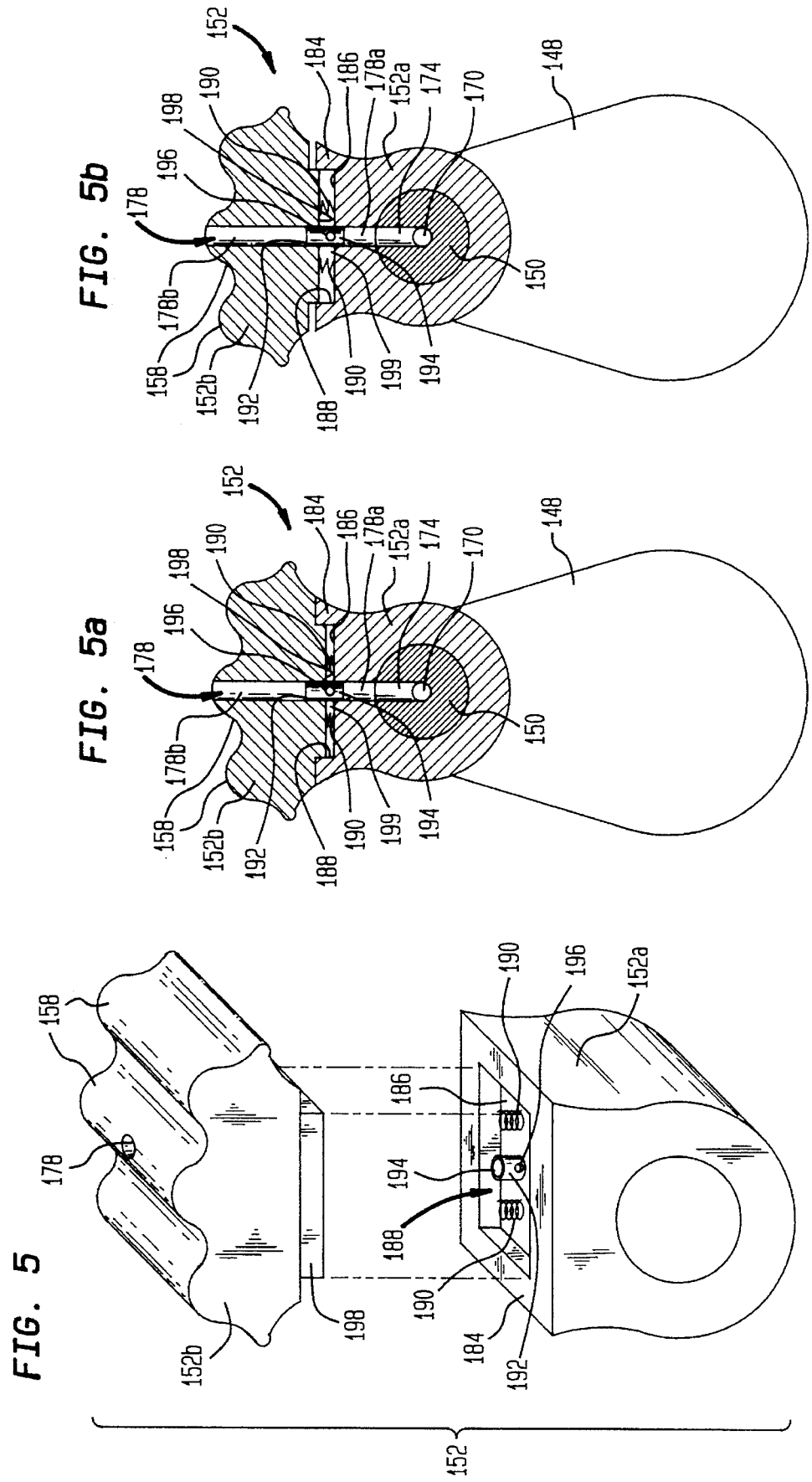

LUBRICATION SYSTEM FOR A CONJUGATE DRIVE MECHANISM

CROSS REFERENCE TO RELATED APPLICATION

This is a continuation in part of application Ser. No. 08/149,064, filed Nov. 8, 1993, now U.S. Pat. No. 5,417,309.

FIELD OF THE INVENTION

The present invention relates to lubrication systems for a motion converter, and, more particularly, to lubrication systems for lubricating a conjugate drive mechanism of a conjugate drive type motion converter. As used herein, the term "conjugate drive mechanism" shall connote a combination of at least two mechanical components (i.e., a "conjugate driver" and a "bearing conjugate" a/k/a "conjugate bearing") adapted to mesh or engage in conjugation with each other throughout the range of motion of the apparatus, such as through the provision of meshable tracking profiles (i.e., undulations), during the operation of an associated motion converter which functions to convert rotary motion to rectilinear motion and vice versa without any clearance between the mechanical components.

BACKGROUND OF THE INVENTION

The scotch yoke has been used for many years as a means for converting reciprocating linear movement to rotary motion and vice versa. It has found application in a variety of machines, such as motors, pumps, and compressors which utilize a piston articulated within a closed cylinder (see, e.g., U.S. Pat. Nos. 283,558; 813,736; 999,220; and 2,628,602), as well as in compactors, pumps, punch presses, robots, sewing machines, generators, and material handlers.

The essential components of a scotch yoke are a crankpin rotated about a crankshaft center at an axial offset and a shuttle having a slot therein through which the crankpin is positioned. The motion of the shuttle is constrained to a linear path by a guide, frequently, a pair of opposing parallel guide surfaces. The crankshaft and crankpin move in rotary motion and may be either the driven elements or the driving elements. The shuttle moves in rectilinear motion and likewise may be the driven element or the driving element. Thus, the scotch yoke provides a means for converting linear to rotary motion and vice versa.

The slot within the shuttle must be at least as wide as the crankpin diameter and long enough to accommodate the crankpin dimension and its travel. A pair of competing objectives in the design of scotch yokes is to eliminate friction, as well as clearance, at the crankpin/slot interface. Friction results in energy loss in the conversion from linear to rotary motion or vice versa and also in wear of the scotch yoke. Clearance at the interface results in a loss of motion translation, commonly called "backlash", when converting from rotary to linear motion and vice versa (i.e., there is no translation during traversal of the clearance gap), and in brinelling, spalling and vibrations when the unrestrained driving element accelerates across the clearance gap and collides into the driven element. As has been recognized for many years, the consequences of clearance and friction at the slot/crankpin interface are energy inefficiency and excessive wear and tear.

U.S. Pat. No. 4,685,342 to Douglas C. Brackett, the inventor herein, discloses a scotch yoke device having a pair of opposing, offset bearing surfaces, one on either side of the crankpin slot in the shuttle. A corresponding pair of roller bearings are arranged on the crankpin coaxially and laterally displaced from one another such that each aligns with one of the pair of opposing, offset bearing surfaces of the slot within which the crankpin is positioned. While the device disclosed in the Brackett '342 Patent minimizes clearance at the crankpin/slot interface to that attributable to manufacturing tolerances and also reduces friction between the crankpin and the shuttle slot to the rolling friction of a roller bearing, these advantages are realized without the benefit of a lubrication system for a conjugate drive mechanism as that term is defined herein.

U.S. Pat. No. 2,628,602 to Butterfield discloses a double-ended piston having means for lubricating the interface between a crankpin and a bearing member, as well as the interface between the bearing member and a slideway of the piston. The bearing member and the slideway do not, however, cooperate to form a "conjugate drive mechanism" as that term is defined herein; and, therefore, the lubricating means of the Butterfield '602 Patent is not employed to lubricate such a mechanism.

SUMMARY OF THE INVENTION

The present invention relates to a lubrication system for a conjugate drive mechanism of a motion converter which includes a rotatable crankshaft having a crankpin, a conjugate driver rotatably mounted on the crankpin, and a bearing conjugate mounted on a linearly movable shuttle such that the bearing conjugate is in continuous conjugating engagement with the conjugate driver as the crankpin rotates, whereby motion is transferable between the crankpin and the shuttle. The lubrication system, which may, for example, include a gallery extending through the crankpin and a passageway extending through the conjugate driver, functions to convey lubricating fluid from a source of pressurized lubricating fluid to an interface between the bearing conjugate and the conjugate driver. In addition to reducing friction between the bearing conjugate and the conjugate driver, the lubricating fluid also minimizes backlash by creating a thin film of lubricating fluid between the conjugate driver and the bearing conjugate, whereby the present invention enhances the energy efficiency and wear resistance properties of the conjugate drive mechanism.

The conjugate driver has a tracking profile which is in continuous conjugating engagement with a trackable profile provided on the bearing conjugate. The tracking profile of the conjugate driver has the same circumferential length as the trackable profile of the bearing conjugate.

BRIEF DESCRIPTION OF THE DRAWINGS

For a better understanding of the present invention, reference is made to the following description of various exemplary embodiments of the invention considered in conjunction with the accompanying drawings, in which:

FIG. 5 is an exploded, perspective view of a modified version of the first exemplary embodiment shown in FIGS. 1–4b;

FIG. 5a is a cross-sectional view of the modified version of FIG. 5 in a retracted position;

FIG. 5b is a cross-sectional view of the modified version of FIG. 5 in an extended position;

DESCRIPTION OF THE EXEMPLARY EMBODIMENTS

Although the present invention can be used with any conjugate drive mechanism, it is particularly suitable for use in connection with conjugate drive mechanisms adapted for use in motion converters disclosed in Brackett U.S. Pat. Nos. 4,685,342 and 5,259,256. Accordingly, the present invention will be described hereinafter in connection with conjugate drive mechanisms adapted for use in combination with such motion converters. It should be understood, however, that the following description is only meant to be illustrative of the present invention and is not meant to limit the scope of the present invention, which has applicability to other types of motion converters.

Figure 1:
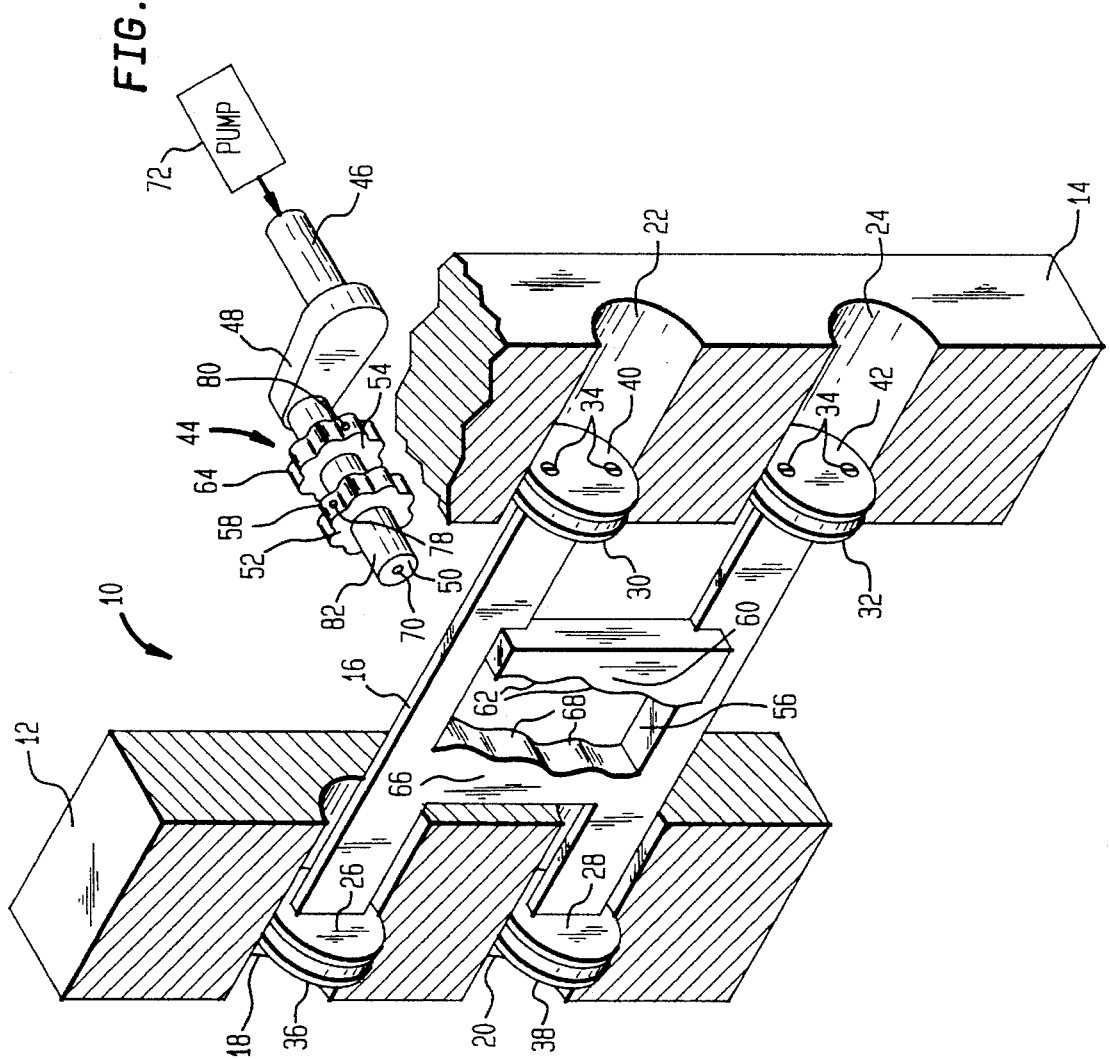
FIG. 1 is an exploded perspective view of a piston engine incorporating a motion converter which is equipped with a first exemplary embodiment of a lubrication system constructed in accordance with the present invention.

FIG. 1 shows a piston engine 10 constructed in accordance with the teachings of Brackett U.S. Pat. No. 4,685,342, the specification of which is incorporated herein by reference, and is equipped with a conjugate drive mechanism (also referred to herein as "conjugate drive", as that term will more fully be defined hereinafter). The piston engine 10 includes a pair of cylinder blocks 12, 14 and a piston shuttle 16. The cylinder block 12 is provided with a pair of cylinders 18, 20, while the cylinder block 14 is provided with a pair of cylinders 22, 24. The shuttle 16 includes a first pair of pistons 26, 28 mounted for reciprocating linear motion in the cylinders 18, 20, respectively, and a second pair of pistons 30, 32 mounted for reciprocating linear motion in the cylinders 22, 24, respectively. The pistons 26, 28, 30, 32 are fastened to the shuttle 16, by screws 34, which are threadedly received in holes (not shown) provided in faces 36, 38, 40, 42 of the pistons 26, 28, 30, 32, respectively, and extending into the shuttle 16.

A crank 44 is operatively associated with the shuttle 16. More particularly, the crank 44 includes a crankshaft 46, a crankarm 48 mounted for conjoint rotation with the crankshaft 46, and a crankpin 50 mounted for conjoint rotation with the crankshaft 46, the crankpin 50 and the crankshaft 46 being offset relative to each other. Conjugate drivers 52, 54 are rotatably mounted on the crankpin 50, which extends through a slot 56 provided in the shuttle 16 such that the conjugate driver 52, which includes a circumferential tracking profile (i.e., undulations) (also referred to herein as "trackable profile") 58, is in constant engagement with a bearing conjugate 60, which includes a circumferential mating profile (i.e., undulations) (also referred to herein as "trackable profile") 62, located on one side of the shuttle 16 and such that the conjugate driver 54, which includes a circumferential tracking profile (i.e., undulations) (also referred to herein as "trackable profile") 64, is in constant engagement with a bearing conjugate 66, which includes a circumferential mating profile (i.e., undulations) (also referred to herein as "trackable profile") 68, located on an opposite side of the shuttle 16. The conjugate drivers 52, 54 and the bearing conjugates 60, 66, respectively, mesh together in conjugation throughout the range of motion of the piston engine 10; and, thus, they cooperate to form a conjugate drive mechanism as that term is defined herein. The conjugate drive mechanism of FIGS. 1 and 2 shares the same attributes of a conjugate drive mechanism employed in a piston device of FIGS. 6–10. Thus, such attributes will become apparent after the description of the conjugate drive mechanism of FIGS. 6–10 is considered hereinafter in conjunction with FIGS. 12–16.

Figure 2:
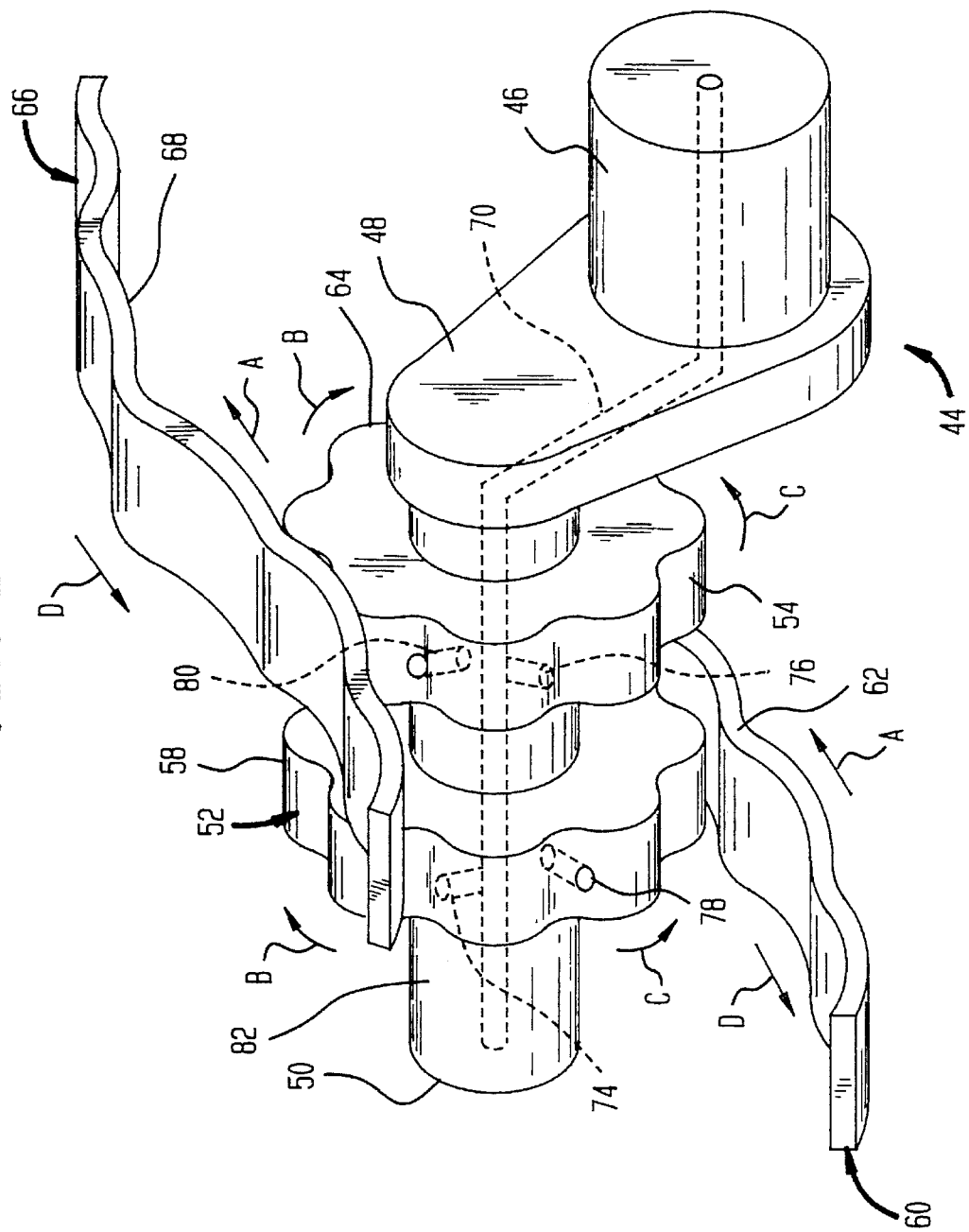
FIG. 2 is an enlarged perspective view of a portion of the motion converter shown in FIG. 1.

Referring to FIG. 1, in general, and to FIG. 2, in particular, the crankpin 50 includes a gallery 70 which extends longitudinally therethrough and which forms a conduit for lubricating fluid supplied under pressure from a source, such as a pump 72. The crankpin 50 has bores 74, 76 communicating with the gallery 70 and extending radially outwardly therefrom. The conjugate drivers 52, 54 include orifices 78, 80, respectively, extending therethrough. The orifices 78, 80 are positioned such that they are alignable with the bores 74, 76, respectively, as the crankpin 50 rotates.

In operation, as the pistons 26, 28, 30, 32 reciprocate linearly in the cylinders 18, 20, 22, 24, respectively, the conjugate drivers 52, 54 move back and forth along the bearing conjugates 60, 66, respectively. More particularly, as the conjugate drivers 52, 54 move in conjugation (i.e., mesh) along the bearing conjugates 60, 66, respectively, in a first direction (indicated by arrows A in FIG. 2), the conjugate driver 52 rotates in one arcuate direction (indicated by arrows B in FIG. 2) and the conjugate driver 54 rotates in an opposite arcuate direction (indicated by arrows C in FIG. 2). As the conjugate drivers 52, 54 move along the bearing conjugates 60, 66, respectively, in a second direction (indicated by arrows D in FIG. 2), the conjugate driver 52 rotates in the arcuate direction indicated by the arrows C and the conjugate driver 54 rotates in the arcuate direction indicated by the arrows B. Because the conjugate drivers 52, 54 are in constant engagement with the bearing conjugates 60, 66, respectively, as the conjugate drivers 52, 54 move back and forth along the bearing conjugates 60, 66, respectively, the linear motion of the shuttle 16 is continuously converted into the rotary motion of the crank 44 to thereby reduce backlash.

Referring to FIGS. 3a–4b, as the conjugate drivers 52, 54 move along the bearing conjugates 60, 66, respectively, the lubricating fluid traveling through the gallery 70 (as indicated by arrows E in FIGS. 4a and 4b) is diverted to an outer surface 82 of the crankpin 50 through the bores 74, 76 (as indicated by arrow H in FIG. 4b and by Arrow F in FIG. 4a, respectively) and lubricates the interface between the crankpin 50 and the conjugate drivers 52, 54. As the conjugate drivers 52, 54 continue their motion, the orifice 78 of the conjugate driver 52 comes into alignment with the bore 74 in the crankpin 50 (see FIGS. 3a and 4a), whereby lubricating fluid flows from the bore 74 through the orifice 78 (as indicated by arrow G in FIG. 4a) and into the interface between the tracking profile 58 of the conjugate driver 52 and the mating profile 62 of the bearing conjugate 60 (not shown in FIGS. 3a–4b). As the conjugate drivers 52, 54 continue their motion, the bore 76 in the crankpin 50 comes into alignment with the orifice 80 of the conjugate driver 54 (see FIGS. 3b and 4b), whereby lubricating fluid flows from the bore 76 through the orifice 80 (as indicated by arrow I in FIG. 4b) and into the interface between the tracking profile 64 of the conjugate driver 54 and the mating profile 68 of the bearing conjugate 66 (not shown in FIGS. 3a–4b).

The lubrication system described hereinabove reduces friction at the interface between the conjugate drivers 52, 54 and the bearing conjugates 60, 66, respectively, and between the crankpin 50 and the conjugate drivers 52, 54. It should be appreciated that the lubrication system also contributes in minimizing backlash by creating a thin film of lubricating fluid between the conjugate drivers 52, 54 and the bearing conjugates 60, 66, respectively, thereby compensating for inadvertent gaps and spaces resulting from manufacturing tolerances and/or wear and tear of the conjugate drive mechanism.

Figure 3B:
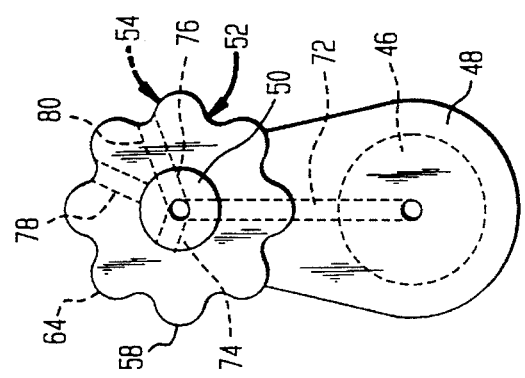
FIGS. 3a and 3b are a series of schematic front elevational views of the first exemplary embodiment as the motion converter of FIGS. 1 and 2 is moved through a portion of its range of motion.
Figure 4B:
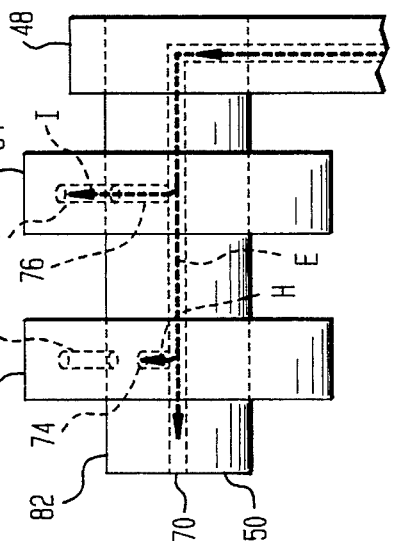
FIGS. 4a and 4b are a series of schematic side elevational views of the first exemplary embodiment which correspond to FIGS. 3a and 3b, respectively.
Figure 3A:
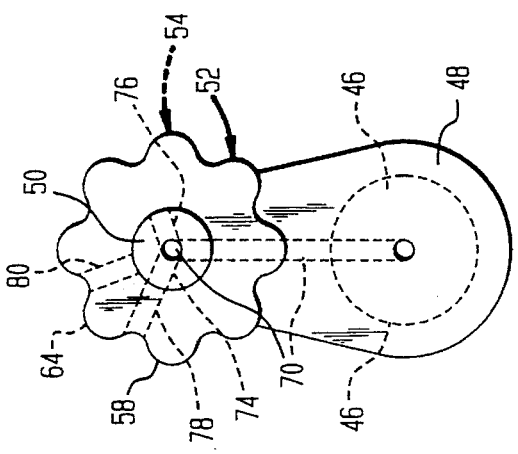
Figure 4A:
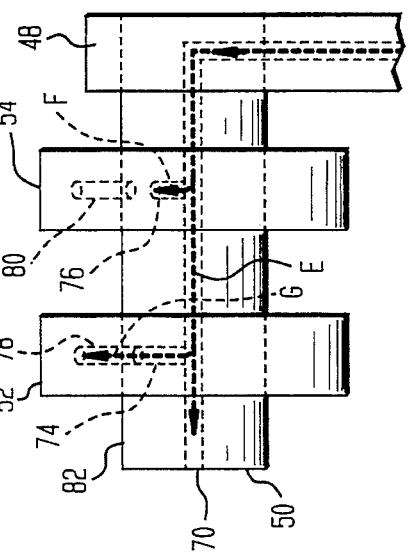

The lubrication system described hereinabove can be configured in various alternative ways. For example, the orifices 78, 80 may communicate with peaks of the undulations of the tracking profiles 58, 64, rather than with their valleys as shown in FIGS. 3a and 3b. In addition, the lubrication system can be configured in such a way that a continuous, rather than intermittent, flow of lubricating fluid is provided to the interfaces between the conjugate drivers 52, 54 and the bearing conjugates 60, 66, respectively, or in such a way that the interface between the conjugate driver 52 and the bearing conjugate 60 and the interface between the conjugate driver 54 and the bearing conjugate 66 are lubricated simultaneously, rather than sequentially.

FIGS. 5–5b depict a modified version of the lubrication system illustrated in FIGS. 1–4b. In FIGS. 5–5b, a numbering convention is employed wherein elements shown therein having a function or structure in common with a counterpart in previously discussed FIGS. 1–4b are given the same number incremented by a hundred.

Referring to FIGS. 5–5b, a conjugate driver 152 is divided into a lower member 152a and an upper member 152b. The lower member 152a is rotatably mounted on a crankpin 150. The lower member 152a has a peripheral wall 184 which extends beyond an upper surface 186 of the lower member 152a to form a socket 188. Springs 190 and a tubular nipple 192 project from the upper surface 186 within the socket 188 for purposes to be described hereinafter. As can be seen in FIG. 5, the nipple 192, which is fixedly mounted in a lower portion 178a of an orifice 178, includes an axial bore 194 and a plurality of radial holes 196 (only one of which is visible in FIG. 5) whose functions will also be described hereinafter.

The upper member 152b has a solid plug 198 which depends therefrom. The plug 198 has a size and shape which complements those of the socket 188, whereby the plug 198 is slidably received within the socket 188 with sidewalls of the plug 198 being in sealing (i.e., fluid-tight) engagement with the peripheral wall 184 of the lower member 152a. An upper portion 178b of the orifice 178 extends through the upper member 152b, including the plug 198. The upper portion 178b of the orifice 178 is sized and shaped such that it slidably receives the nipple 192 of the lower member 152a (see FIG. 5).

As can be seen in FIG. 5a, the plug 198 has a height which is slightly less than the depth of the socket 188. Thus, when the plug 198 is in its fully retracted position within the socket 188 as shown in FIG. 5a, the plug 198 does not "bottom out" on the upper surface 186 of the lower member 152a; but, rather, the plug 198 is suspended above the upper surface 186 to create a space 199 which is in communication with the radial holes 196 of the nipple 192 for a purpose to be described hereinafter. The space 199 also accommodates the springs 190, which are fully compressed by the plug 198 when it is in its fully retracted position as shown in FIG. 5a.

As the conjugate driver 152 rotates about the crankpin 150, the springs 190 constantly urge the upper member 152b of the conjugate driver 152 against an associated bearing conjugate (not shown). Unlike the conjugate driver 52 shown in FIGS. 1–3b which has a tracking profile on its entire circumference, the conjugate driver 152 has a tracking profile 158 on only a portion of its circumference, provided that the conjugate driver 152 makes less than a complete revolution while moving along its associated bearing conjugate. More particularly, the tracking profile 158 is provided on that portion of the conjugate driver 152 which actually engages the associated bearing conjugate. Preferably, the total perimetrical length of the tracking profile 158 should be substantially equal to the length of the associated bearing conjugate.

If the conjugate driver 152 becomes worn, the springs 190 function to move the upper member 152b from its retracted position depicted in FIG. 5a toward its extended position depicted in FIG. 5b, thereby compensating for such wear and, as a result, reducing backlash and scuffing. As the pressurized lubricating fluid flows from the lower portion 178a of the orifice 178 to the upper portion 178b of the orifice 178 via the nipple 192, a portion of the pressurized lubricating fluid is diverted into the space 199 through the radial holes 196 to thereby assist the springs 190 in urging the upper member 152b against its associated bearing conjugate. To maximize the force of the pressurized lubricating fluid, it may be desirable to provide an annular sealing member (not shown) between the sidewalls of the plug 198 and the peripheral wall 184 of the lower member 152a and/or to provide for a continuous flow of lubricating fluid through the orifice 178 and, hence, to the space 199. Furthermore, the lubrication system could be configured in such a way that a continuous flow of lubricating fluid is supplied to the space 199, while lubricating fluid is intermittently supplied to the interface between the conjugate driver 152 and the associated bearing conjugate. If the lubricating fluid is continuously supplied to the space 199 at a high enough pressure, then the springs 190 could be eliminated.

It should be noted that the relative movement between the upper member 152b and the lower member 152a can be achieved in various ways. For example, magnetic and/or pneumatic means may be employed in conjunction with or instead of the springs 190 and/or the pressurized lubricating fluid (i.e., the hydraulic urging means). Furthermore, the associated bearing conjugate, instead of or in addition to the conjugate driver 152, could be divided into a pair of members, one of which would have a mating profile and would be movable relative to the other member.

Figure 6:
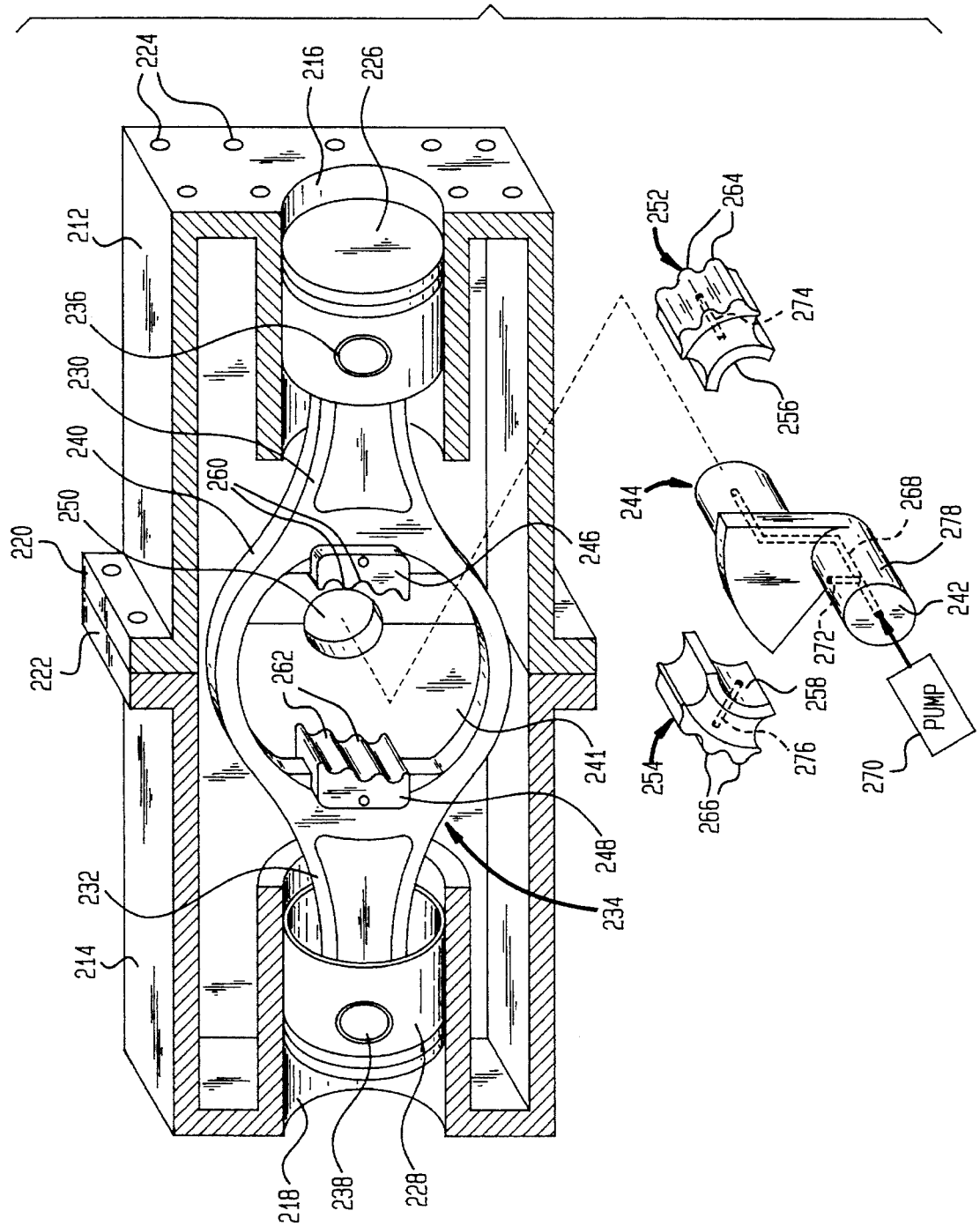
FIG. 6 is an exploded perspective view of a reciprocating piston device incorporating a motion converter which is equipped with a second exemplary embodiment of a lubrication system constructed in accordance with the present invention.

FIG. 6 shows a piston device 210 constructed in accordance with the teachings of Brackett U.S. Pat. No. 5,259,256, the specification of which is incorporated herein by reference. The piston device 210 comprises a pair of cylinder blocks 212, 214, each of which has a cylinder bore 216 and 218, respectively. The cylinder blocks 212, 214 would be joined together via opposing flanges 220, 222 by bolts etc. or by studs extending through the blocks and projecting from holes 224 for securing a cylinder head (not shown) via suitable nuts (not shown) as would be conventional in constructing cylinder blocks with opposed cylinders. The cylinder bores 216 and 218 receive corresponding pistons 226 and 228 which are mounted upon the terminal ends of extensions 230 and 232 of shuttle 234 by wrist pins 236 and 238 or other conventional means. The extensions 230 and 232 emanate from a common yoke portion 240 of the shuttle 234.

The yoke portion 240 is provided with an aperture 241 which accommodates a crankpin 242 of crankshaft 244. The internal peripheral boundary of the aperture 241, instead of simply being a smooth slot, includes a pair of bearing conjugates 246 and 248 on either side thereof. In the embodiment depicted, the bearing conjugates 246, 248 are a pair of discrete elements, each being bolted to the shuttle 234 on opposing sides of the aperture 241. Alternatively, the bearing conjugates 246, 248 could be defined by an apertured plate or plates secured to or integrated with the shuttle 234, the aperture being formed such that the interior periphery defines the bearing conjugates 246, 248. It should be appreciated that while the aperture 241 passes completely through the shuttle 234, it is possible to replace the aperture 241 with a recess or blind hole. For example, in the device shown in FIG. 6, if the yoke portion 240 were closed by a continuous metal surface on the side closest to the viewer, a recess facing toward bearing opening 250 would be formed. This recess could accommodate the free end of the crankpin 242. The use of the aperture 241 is beneficial because it permits the crankshaft 244 to project through the shuttle 234, whereby additional bearings and crankpins may be made a part thereof, such as, for example, to cooperate with another set of adjacent pistons.

The crankpin 242 has a pair of conjugate drivers 252, 254 rotatably associated therewith when the crankshaft 244 is in place in the bearing opening 250, as is more clearly shown in FIGS. 7–10. With the crankshaft 244 positioned within the opening 250 and the crankpin 242, including the conjugate drivers 252, 254, positioned within the aperture 241 of the yoke portion 240, the conjugate drivers 252, 254 mesh with the bearing conjugates 246, 248, respectively, which capture the crankpin 242 and the conjugate drivers 252, 254 therebetween. The crankpin 242 is isolated from contact with the periphery of the yoke portion 240 and instead bears upon bearing surfaces 256, 258 of the conjugate drivers 252, 254, respectively. As can be appreciated, this arrangement prevents the crankpin 242 from bearing upon the yoke portion 240 directly and permits the fitting of the crankpin 242 to the aperture 241 within manufacturing tolerances. As can be seen in FIGS. 7–10, the bearing conjugates 246, 248, which include mating profiles or undulations (also referred to herein as "trackable profiles") 260, 262, respectively, formed on tracking surfaces thereof, and the conjugate drivers 252, 254, which include tracking profiles or undulations (also referred to herein as "trackable profiles") 264, 266, respectively, formed on tracking surfaces thereof, mesh together in conjugation throughout the range of motion of the piston device 210; and, thus, they cooperate to form a conjugate drive mechanism as that term is defined herein. It should be noted that the present invention is not intended to be directed to traditional involute gearing with tip/root clearance. FIGS. 6–10 depict concentric, tri-lobed, conjugate drivers and bearing conjugates which have a pitch line inclined from the perpendicular of the direction of reciprocating motion. Numerous other configurations for the conjugate drivers and the bearing conjugates may be selected, as described at length in the Brackett '256 Patent.

In order to lubricate the conjugate drive mechanism, the piston device 210 is provided with a lubrication system including a gallery 268 which extends longitudinally through the crankshaft 244 and the crankpin 242 and which forms a conduit for lubricating fluid supplied under pressure from a source, such as a pump 270. The crankpin 242 has a bore 272 communicating with the gallery 268 and extending radially outwardly from the gallery 268. The conjugate drivers 252, 254 have orifices 274, 276, respectively, extending therethrough from the bearing surfaces 256, 258 to the tracking profiles 264, 266, respectively. The orifices 274, 276 are positioned such that they are alignable with the bore 272 as the crankshaft 244 rotates and the conjugate drivers 252, 254 pivot about the crankpin 242 for a purpose to be described hereinafter.

Figure 7:
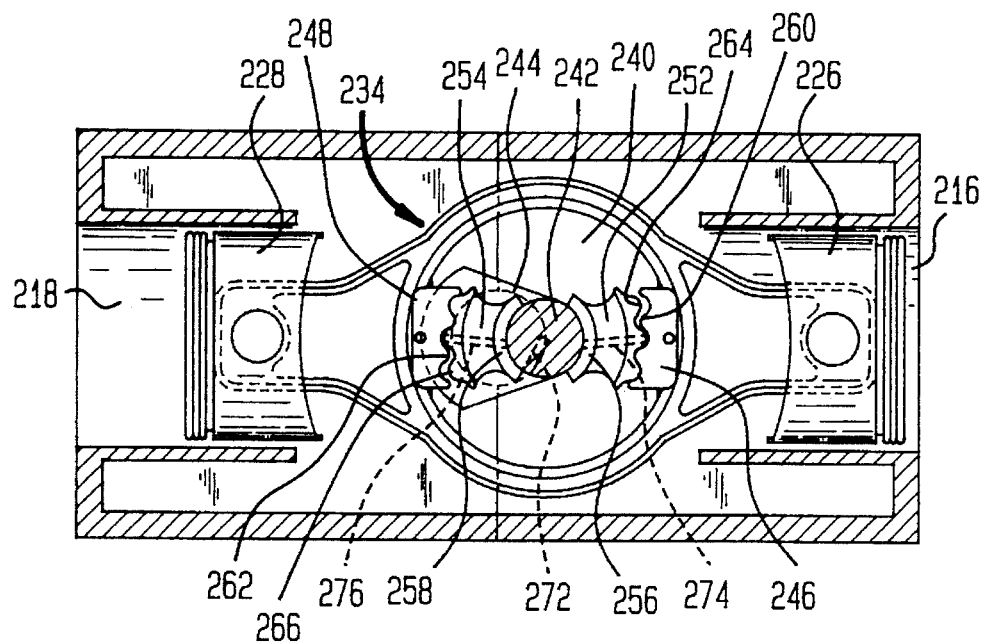
FIGS. 7–10 are a series of schematic front elevational views of the second exemplary embodiment as the motion converter of FIG. 6 is moved through a portion of its range of motion.
Figure 8:
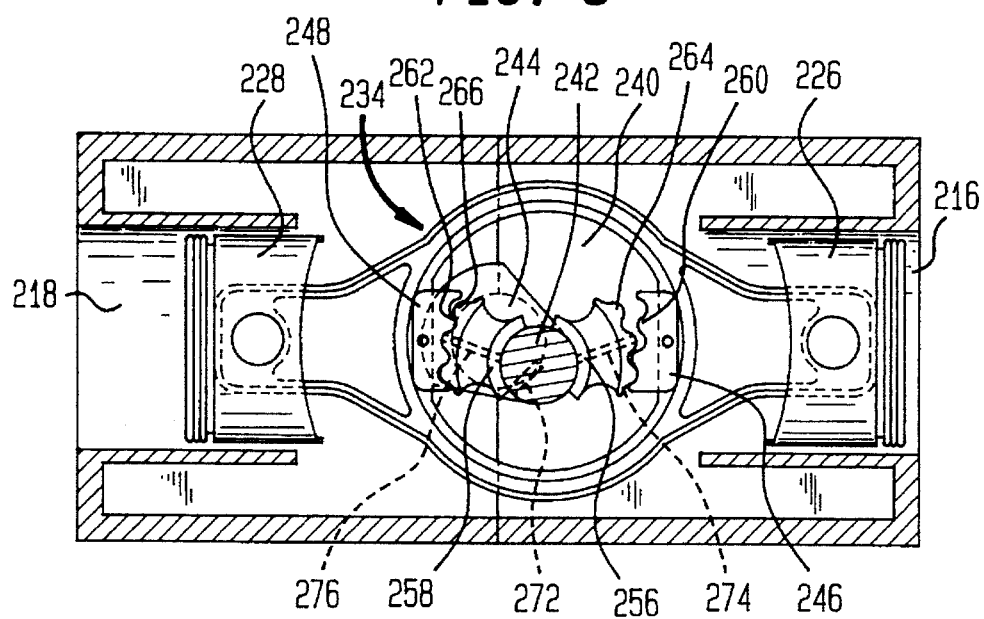
Figure 9:
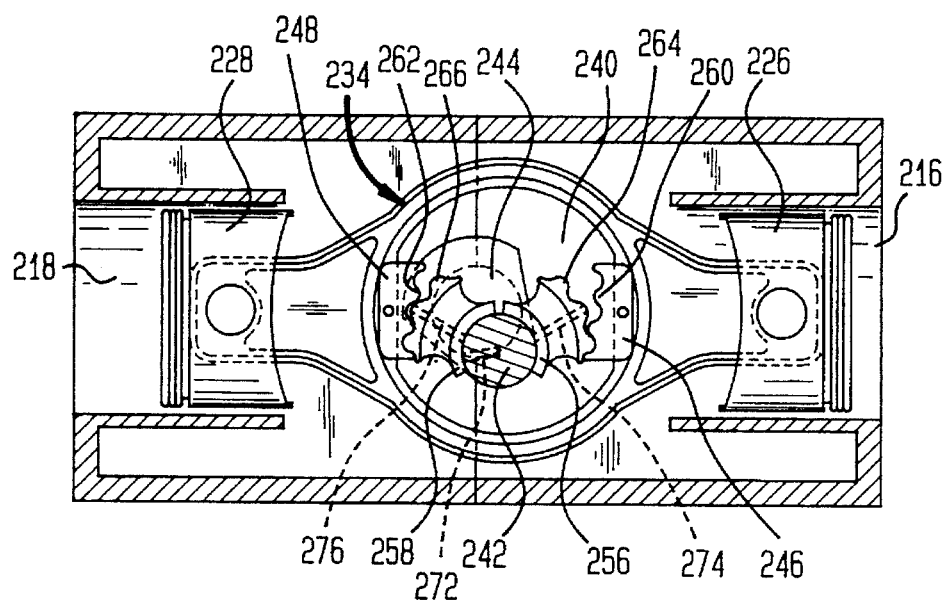
Figure 10:
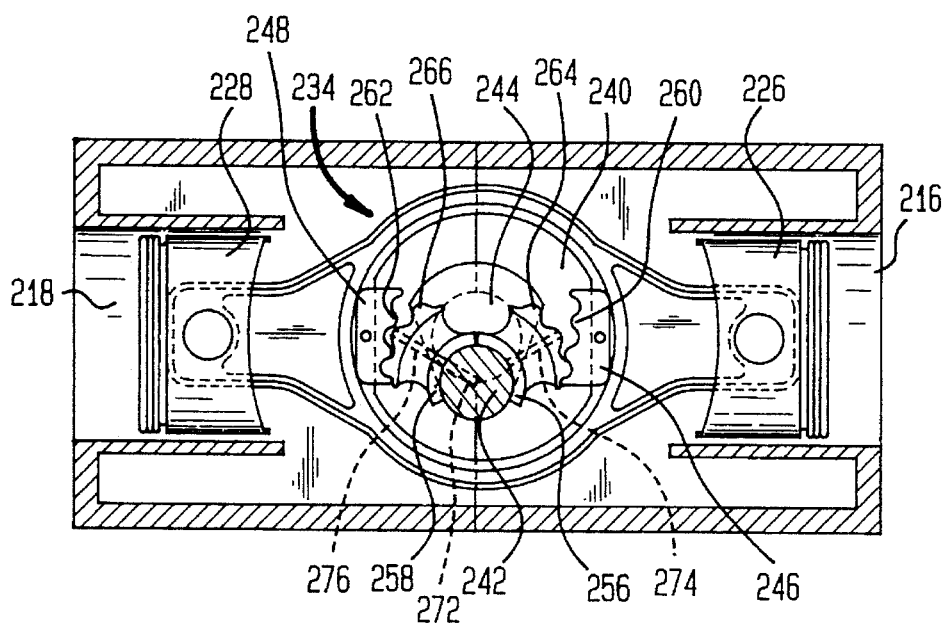

FIGS. 7–10 show the piston device 210 at four different positions during the travel of the crankshaft 244 through ninety degrees of rotation. FIG. 7 shows the crankpin 244 at 0 or 360 degrees relative to the axis of the cylinders 216, 218. FIG. 8 shows the crankpin 244 at 30 degrees. In FIG. 9, the crankpin 244 is at 60 degrees; and in FIG. 10, the crankpin 244 is at 90 degrees.

As the crankshaft 244 rotates, the crankpin 242 moves up and down within the yoke portion 240 relative to the axis of the cylinders 216, 218 (i.e., in a vertical direction). The horizontal component of crankpin 242 motion is translated into the rectilinear motion of the shuttle 234. The crankpin 242 is captured between the bearing surfaces 256, 258 of the conjugate drivers 252, 254 and is therefore prevented from contacting the interior periphery of the aperture 241. The conjugate drivers 252, 254 pivot about the crankpin 242 as the crankshaft 244 rotates, the bearing conjugates 246, 248 being immovable in the direction perpendicular to the linear path of the shuttle 234 and the pistons 226, 228. The conjugate drivers 252, 254 pivot in opposite directions and can therefore be said to be counter-rotating. The crankpin 242, assuming that it has an axial offset "r" from the crankshaft 244, causes a reciprocating linear motion of the shuttle of magnitude 2r, ranging from −r to +r.

As the crankshaft 244 rotates, the lubricating fluid travels through the gallery 268, is diverted to an outer surface 278 of the crankpin 242 through the bore 272 and lubricates the interface between the outer surface 278 of the crankpin 242 and the bearing surfaces 256, 258 of the conjugate drivers 252, 254. As the orifice 276 of the conjugate driver 254 comes into alignment with the bore 272 (see FIG. 10), the lubricating fluid flows from the bore 272 into the orifice 276. From the orifice 276, the lubricating fluid is delivered to the interface between the tracking profile 266 of the conjugate driver 254 and the mating profile 262 of the bearing conjugate 248. As the crankshaft 244 continues its rotating motion, the bore 272 would come into alignment with the orifice 274 of the conjugate driver 252 so that the lubricating fluid could be supplied to the interface between the tracking profile 264 of the conjugate driver 252 and the mating profile 260 of the bearing conjugate 246.

Figure 12:
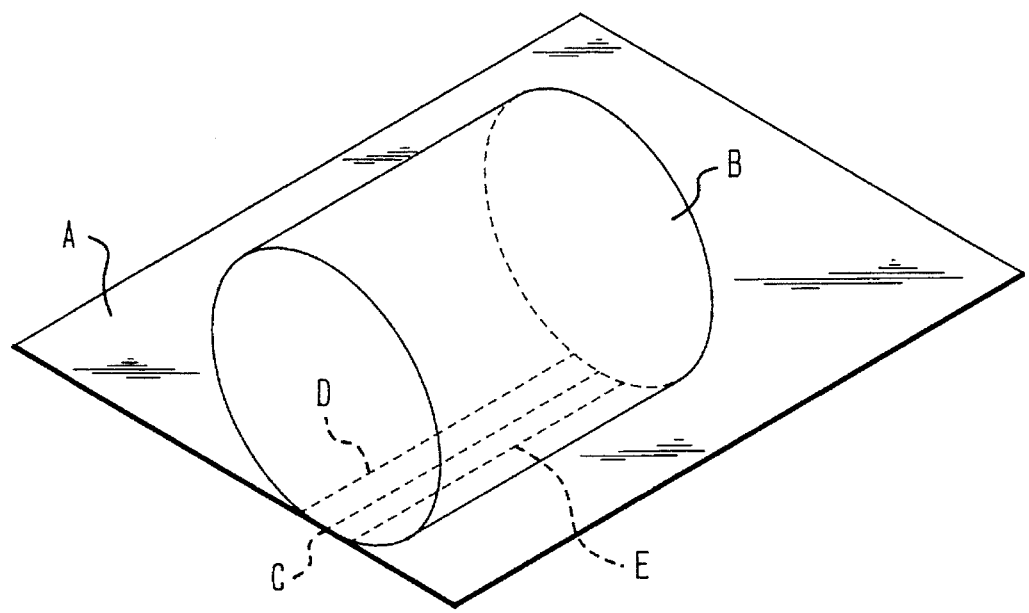
FIG. 12 is a perspective view of a prior art mechanism consisting of a cylindrical roller contacting a flat surface.

The conjugate drive mechanism of FIGS. 6–10, which share the same attributes of the conjugate drive mechanism of FIGS. 1 and 2, provides several functional advantages over a roller bearing riding upon a flat surface or traditional gear shapes that otherwise might be used to intermediate between the crank and shuttle. For example, a roller bearing or wheel riding upon a flat surface could be depicted as shown in FIG. 12. In FIG. 12, the flat bearing surface A is tangent to the circumference of the wheel or roller B. As such, there is a high degree of divergence of the two surfaces with greater divergence associated with smaller circumference. If the wheel and flat bearing surface were non-deformable and/or there is no pressure urging them together, then there would be line contact between the wheel and bearing surface, as depicted by dotted line C. If the wheel is urged toward the bearing surface, and the materials exhibit normal elastic behavior, the elasticity of the materials results in a deformation in both such that there is a flattening out of the wheel and a depression of the flat surface resulting in an increase in contact area as represented by the area between dotted lines D and E. In the case of steel or other hard metals, the degree of deformation will be microscopic and will depend upon the modulus of elasticity of the material and the compressive force applied.

Figure 13:
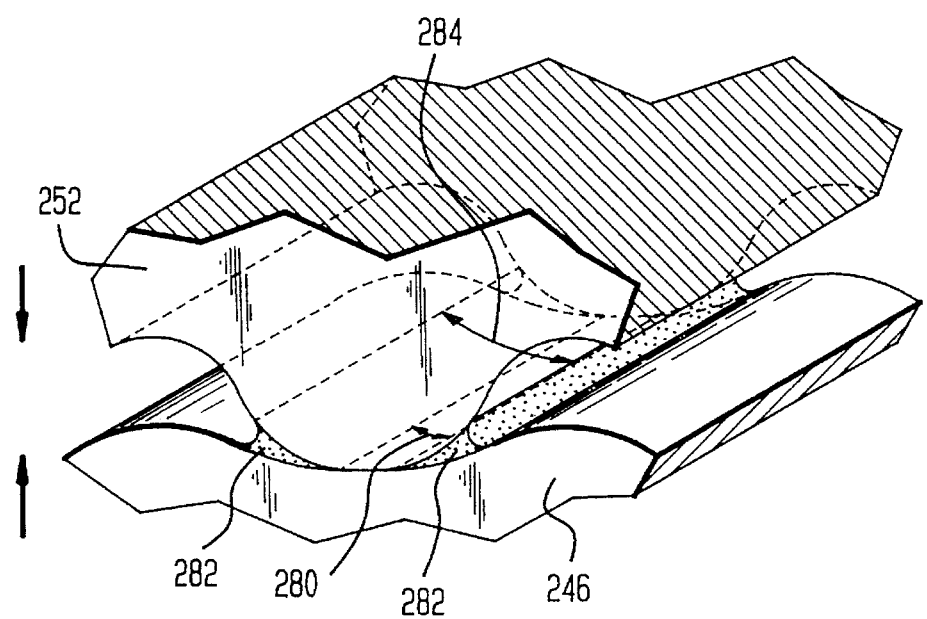
FIG. 13 is an enlarged segment of a conjugate drive mechanism of the piston device shown in FIGS. 6–10.

It can be observed in FIG. 13 that impinging curved surfaces sharing a similar average radius and direction of curvature generate a relatively wide band of effective contact area under loading forces. It should be understood that in the unloaded condition, similar but different curves will touch only along a single contact line. For example, if a cylinder is placed within a slightly larger cylinder, there can only be line contact between the cylinders at any one time (assuming no deformation). Deforming compressive forces alter this relationship significantly. FIG. 13 shows a segment of a conjugate driver, e.g., 252 impinging upon a mating portion of its corresponding bearing conjugate 246. The junction is under compressive force, as indicated by the converging arrows to the left of the drawing. Even though the curves describing the respective profiles of the conjugate driver 252 and the bearing conjugate 246 differ, they are similar. Thus, under compression, the deformation of the conjugate driver 252 and the bearing conjugate 246 results in an increase of contact area represented by the band spanned by the double-headed arrow 280. This area could be denominated the effective dry contact area under compression. The greater effective contact area experienced due to similar curved surfaces under load is a consequence of the fact that there is less distance between similarly curved surfaces than between, e.g., a curve and its tangent line. For a given deformation displacement due to metal elasticity, a larger portion of approximately parallel surfaces will come into contact than for clearly non-parallel surfaces.

Curved surfaces which tend toward parallelism are also more efficacious for establishing and maintaining a hydrodynamic wedge or film of lubricating oil between the mating surfaces. As illustrated in FIG. 13, hydrodynamic wedges of lubricant 282 not only prevent dry contact between the mating elements but also function to transfer compressive force between the converging surfaces thereby distributing the compressive force over a greater area and increasing the effective contact area. This hydrodynamic effective contact area is illustrated by double-headed arrow 284. Both the dry effective contact area 280 and the hydrodynamic effective contact area 282 will vary with the compressive force and the speed of surface conjugation.

The conjugate drive mechanism of FIGS. 6–10 exhibits mating surfaces which are more closely parallel than a tangent line to a circle. Stated another way, the average radius over a number of degrees of the "tooth" projection of the conjugate driver 252 and the average radius over the same number of degrees of the mating "tooth" depression in the bearing conjugate 246 differ only slightly. In contrast, the radius of a wheel differs by an infinite amount over the radius of a straight line which has a radius of infinite length. The practical consequence of this approximate parallelism, which exists at least over short distances, is that the deformations associated with a given load and material composition result in a greatly increased effective contact area over that of a wheel on a flat surface. One might also note that wheels, with their limited contact, concentrate the deformation forces along a narrow band of contact which results in metal fatigue and/or deformation beyond the elastic limit resulting in permanent deformation at positions of high compression (e.g., flattening of the wheel and/or bellying of the flat surface). In addition, at points in the cycle where there is light or no load on the wheel/surface interface, there can be a loss of contact or slippage such that the wheel fails to track over the bearing surface.

If conventional gearing were applied at the conjugate drive/bearing conjugate interface, it would partially solve the problem of a lack of tracking and slippage associated with wheels or rollers by exhibiting the gross mechanical interaction of interdigitation; but it would also present another set of problems. Conventional gearing typically utilizes a first rotatable member rotating about a fixed axis and having a plurality of teeth. The teeth of the first rotatable member interdigitate with the teeth of either a second rotatable member or a linearly moving rack. The teeth of the first (driver) member "paddle" against the teeth of the second (driven) member such that force is delivered by the faces of the driver gear teeth to the faces of the driven gear teeth in a direction tangent to the pitch line (i.e., circle) of the driver gear. A clearance is provided between each gear tooth tip of the first gear and the corresponding root fillet of the mating gear. There is no contact between tip and root.

In contrast, the piston device 210 of FIGS. 6–10 is intended to transmit force between a linearly reciprocating shuttle and the crankpin of a rotating crankshaft. This force is transmitted through the trackable profile interface of the conjugate driver and bearing conjugate. The transmission of force in the piston device 210 has significant components normal to the driver/bearing interface. Thus, the conjugate profiles are urged into compression against one another. "Paddling" type interdigitating gear teeth are not a suitable alternative for bearing compressive loads, owing, at least partially, to the clearance gap present at the tip/root interface. If interdigitating gear teeth are subjected to the forces encountered by the conjugated profiles of the piston device 210, the interdigitating teeth of each gear would be urged toward the tip/root gap of the other gear, thereby causing a wedging action of the interdigitating teeth. This successive wedging action creates tremendous friction and an unacceptable amount of wear and could not be used in a workable device. Conventional gearing has inherent clearance and, thus, loss of contact and slippage. As described, the tip/root gap of conventional gearing does not provide an adequate load bearing support surface and indeed represents a "loss of contact". In this respect, conventional gearing exhibits an intermittent contact surface (due to the intermittent loss of contact between tip and root) in contrast to the continuous contact surface of the conjugate drive mechanism of the present invention.

As can be appreciated from the above description of FIGS. 12 and 13, the effective area of contact between the conjugate driver 252 and the bearing conjugate 246 of the piston device 210 of FIGS. 6–10 is substantially increased over the line contact of a roller bearing (or wheel) on a tangent surface as depicted in FIG. 12. This results in the potential of the piston device 210 to endure greater typical primary normal loading forces, thereby increasing its power density. The arrangement depicted herein (see, for instance, FIG. 13) can support greater loading forces directed along the line perpendicular to the pitch line than gear shapes which are intended to transfer torsional forces acting parallel to the pitch line. The trackable profiles of the conjugate drivers 252, 254 and bearing conjugates 246, 248 constitute the actual pitch lines and are therefore tangible rather than an intangible abstract line as in conventional gear teeth. The trackable profiles can therefore be denominated "pitch surfaces."

It should be apparent that the conjugate drivers 252, 254 and bearing conjugates 246, 248 can be configured in a variety of ways. In each instance, however, it is an objective to prevent scuffing, thereby providing an adequate load bearing support surface. Scuffing of the surfaces is avoided when the conjugate drivers 252, 254 track along the profiles of the bearing conjugates 246, 248 without loss of contact or slippage throughout the range of motion of the device. Bearing conjugates 246, 248 thus constitute trackable profiles with respect to the conjugate drivers 252, 254. In addition, one could observe that the total circumferential length of the trackable profiles of each of the bearing conjugates 246, 248 equals the total circumferential length of the corresponding profile of the conjugate drivers 252, 254, respectively.

Figure 14:
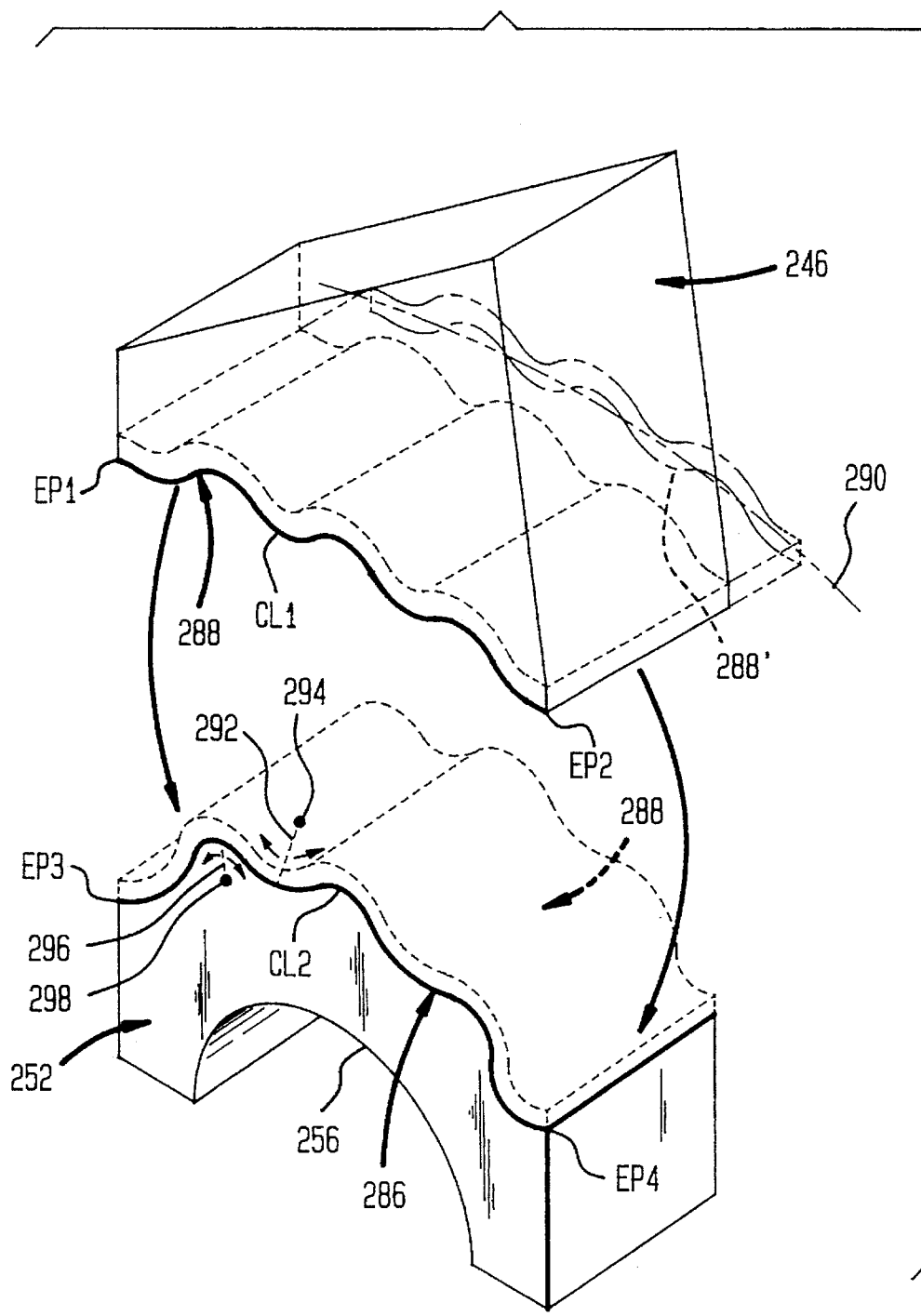
FIG. 14 is an enlarged view of a conjugate driver and mating bearing conjugate of the piston device shown in FIGS. 6–10, illustrating diagrammatically the relationship between respective mating surfaces of the conjugate driver and the bearing conjugate.

FIG. 14 illustrates the conjugate drive mechanism of FIGS. 6–10 and depicts the relationship between the conjugate driver outer surface 286 (i.e., the surface extending transversely across the conjugate driver 252 from the boldfaced curvilinear line CL2) and the bearing conjugate outer surface 288 (i.e., the surface extending transversely across the bearing conjugate 246 from the boldfaced curvilinear line CL1). Given a particular undulation pattern on either member, a mating trackable profile may be generated on the other. The undulation pattern of the bearing conjugate 246, for example, could be described as a continuous series of displacements above, on (zero displacement) and below a reference surface. An end-on cross-sectional view of this surface is a projection of the surface contour or profile of the bearing conjugate outer surface 288. Dotted line 288 can be defined as a series of displacements above, on (zero displacement) and below a reference line 290. In FIG. 14, the undulation pattern of the bearing conjugate outer surface 288 is translated or superimposed upon (see the phantom representation of the surface 288) the generally arcuate shape of the conjugate driver 252 to give the resultant contour of its outer surface 286. The undulations in the conjugate driver 252 can be defined by a series of displacements above, on (zero displacement) and below a reference surface associated with the conjugate driver 252, (not shown for simplicity of illustration), e.g., a cylindrical section parallel to the conjugate driver crank bearing surface 256. The bearing conjugate outer surface 288 has a circumferential length CL1, as measured between end points EP1, EP2. The circumferential length CL2 of the conjugate driver outer surface 286 is measured between end points EP3, EP4 and is of equal length to CL1.

A physical analogy for this conjugation relationship is that the undulating pattern of the bearing conjugate 246 is bent over the arcuate shape of the conjugate driver 252. It is not necessary that the conjugate driver's arcuate shape (i.e., its reference surface) be a simple cylinder, rather it may embody a compound and complex curvature. Similarly, the reference line 290 may be straight, a simple curve or a compound, complex curve. The shapes of the respective reference surfaces are selected to control the motion of the crankpin 242 (see FIG. 10) relative to the shuttle 234. It should be observed that in translating the undulations from the bearing conjugate 246 to the conjugate driver 252, the exterior radii, e.g., 292 from center 294 associated with the conjugate driver profile (outer surface 286) are lengthened while the interior radii, e.g., 296 from center 298 are shortened. With respect to certain profile shapes, such as, a compound complex curved surface, it is a simplification to associate a significant portion of the profile shape to a few radii. In that particular instance, the resulting profile curvature could be described as a chain of small arcs swept by numerous radii having distinct centers on either side of the profile.

Despite the change in radii, the overall circumferential length (which is represented by the boldfaced curvilinear line CL1, as measured between end points EP1, EP2) of the trackable profile of the bearing conjugate 246 remains the same after translation onto the conjugate driver 252, whereby the overall circumferential length (which is represented by the boldfaced curvilinear line CL2, as measured between end points EP3, EP4) of the trackable profile of the conjugate driver 252 equals the overall circumferential of the bearing conjugate 246. That is, if both surfaces were straightened, they would be the same length (i.e., CL1= CL2). Owing to this relationship, the surface 286 of the conjugate driver 252 can track line-by-line over the surface 288 of the bearing conjugate 246 without slippage and without clearance. With respect to terms such as "equal" and "no clearance", the inventor herein recognizes that these conditions are achievable in the real world only to the level of precision inherent in machine tools. However, objectives of "equality", "no clearance" and "no scuffing" are clearly distinguishable, both in fact and intent, from clearances, such as the root/tip clearance, that are designed in or provided for in conventional gearing.

Figure 15:
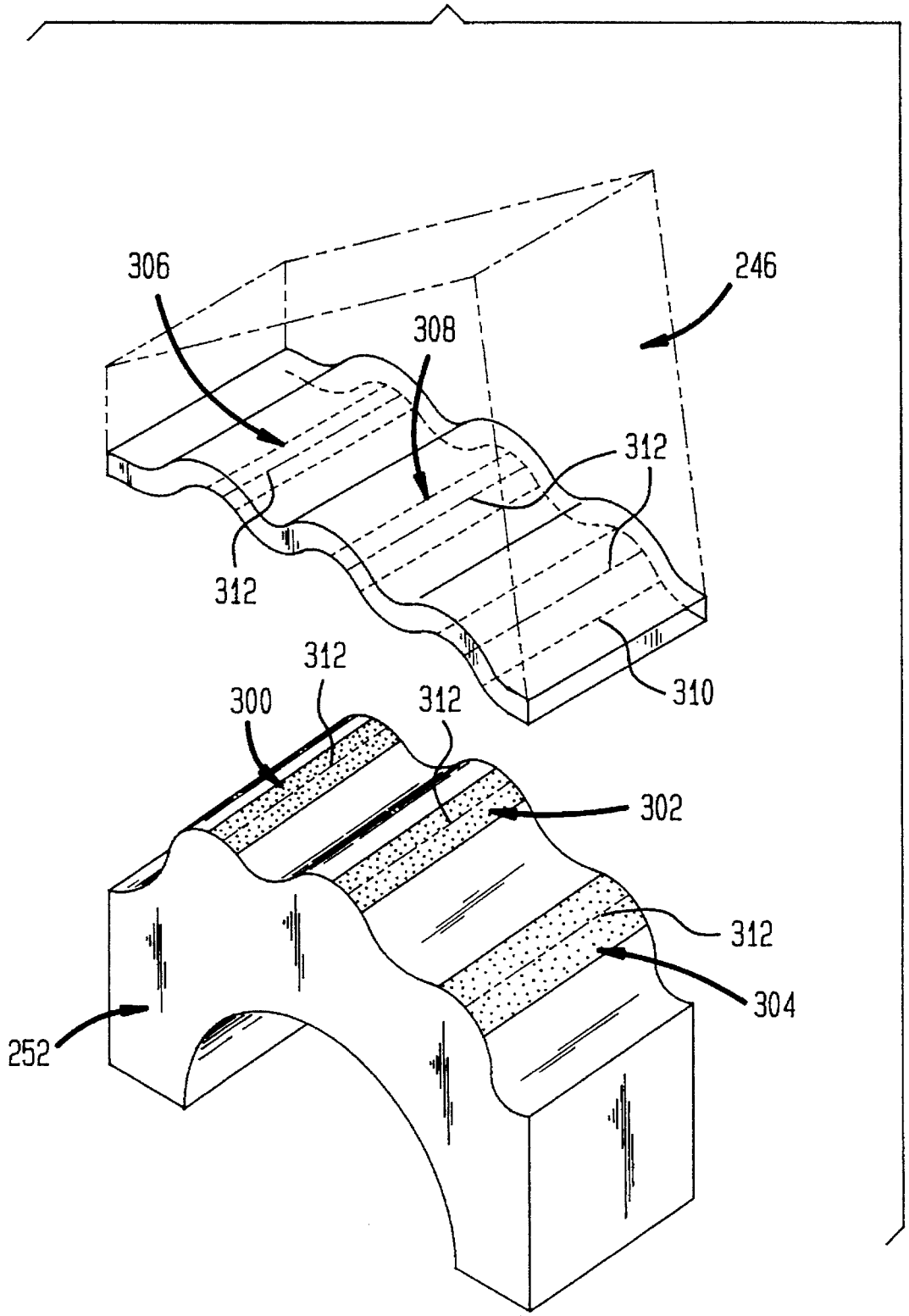
FIG. 15 is an enlarged view of the conjugate driver and mating bearing conjugate of FIG. 14 showing selected sequential contact areas.

FIG. 15 illustrates the increased dynamic effective contact area associated with the similar but unique curved surfaces of the mating conjugate driver 252 and bearing conjugate 246 (partially in phantom) under compression. The contact surfaces associated with three distinct positions occurring at distinct periods of time are illustrated. It should be understood that the three contact areas shown would not exist simultaneously as shall be further explained below. In addition, FIG. 15 depicts the tracking relationship between the conjugate driver 252 and bearing conjugate 246 (no slippage, clearance or scuffing). More specifically, in the conjugate drive mechanism of FIGS. 6–10, the correlation of line-for-line contact between the bearing conjugate 246 and the conjugate driver 252 is, under working conditions, a correlation of bands or strips of contact, when the motion conversion apparatus is operating and the interface between the conjugate driver 252 and the bearing conjugate 246 is subjected to compressive loading forces. In addition, the effective contact area is increased by the presence of a lubricant.

FIG. 15 shows a selected group of contact areas 300, 302, 304 on the conjugate driver 252 associated with discrete points in time at discrete phases of a full range of travel of the conjugate drive 252 under one set of operating conditions, e.g., engine under no load and running at 1000 RPMs. These contact areas on the conjugate driver 252 correspond with contact areas 306, 308, 310 on the bearing conjugate 246. As illustrated, the effective surface contact areas will vary depending upon variations in loading forces experienced at different degrees in the cycle. During times of extremely high loading or overload, the dry contact area may be larger. When lightly loaded, e.g., at low RPM, the effective dry surface contact approaches line contact but a more substantial effective contact area is maintained by the hydrodynamic effect of the lubricant. To illustrate the potential variations in the width of the effective contact area due to loading, area 304 is shown as being larger than area 300. To depict the distinction between the effective contact area, e.g., 304 and the line contact associated with dry unloaded operation, a dotted line 312 is drawn through each effective contact area shown. On account of its influence on the effective contact area, the lubricant may be denominated a "contact medium" or "constant contact medium."

In operation, the effective surface contact area migrates along the interface between the conjugate driver 252 and the bearing conjugate 246 as the conjugate driver 252 tracks over the bearing conjugate 246. This migration is uninterrupted due to the constant contact between the conjugated members 246, 252. One could also express this relationship by noting that there are a continuum of contact lines (only a few of which are depicted in FIG. 15 as the dotted lines 312) arranged along the entire circumferential length of the respective profiles of the conjugate driver 252 and conjugate bearing 246. Further, the respective contact lines serially contact a corresponding contact line on the mating profile as the conjugate drive progresses through its range of motion. In this manner, the entireties of the outer surfaces 286, 288 contribute to load transmission and may be said to be load transmitting surfaces. The contact areas shown in FIG. 15 represent the contact areas that would be present at three different times.

Figure 16:
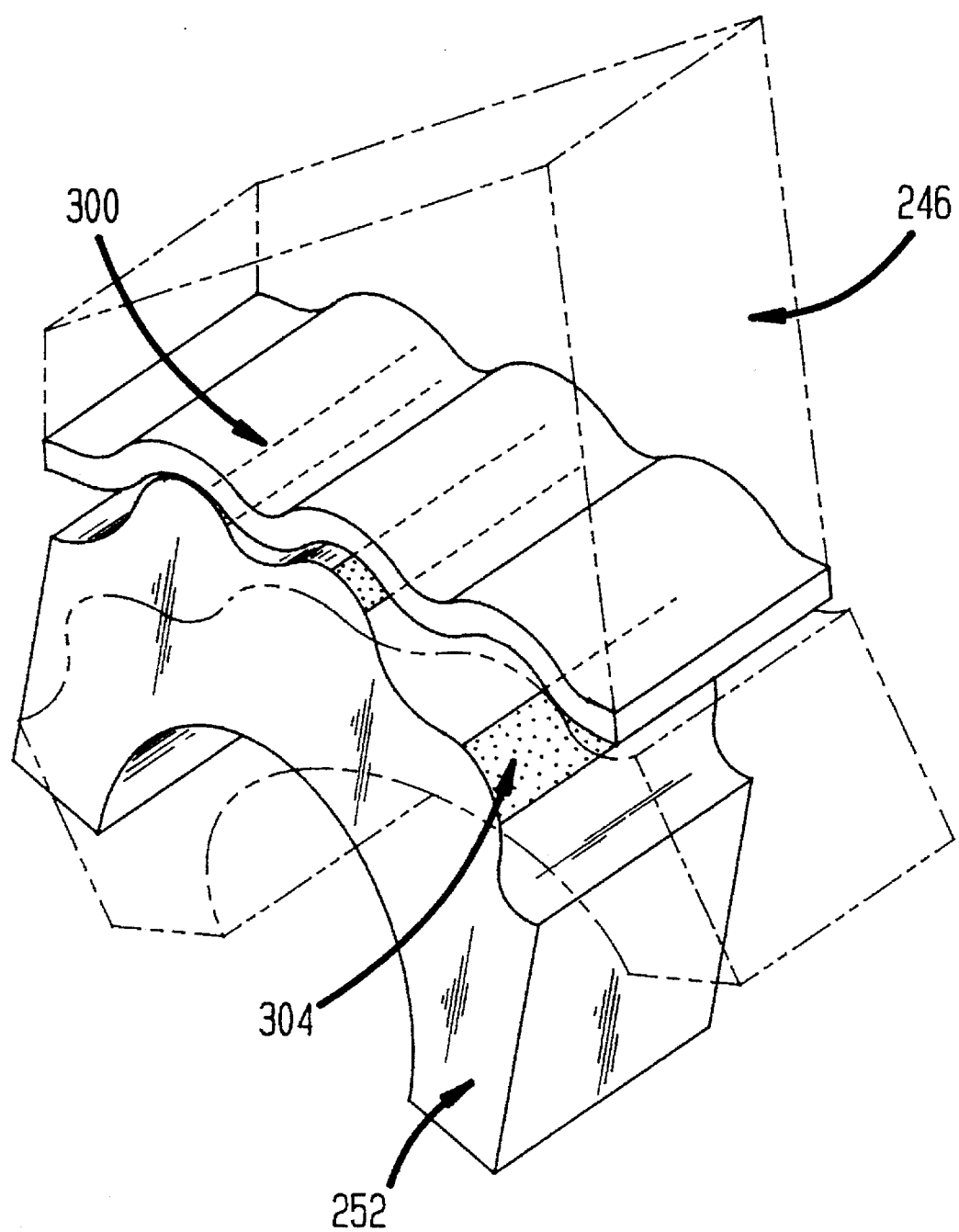
FIG. 16 is an enlarged view of the conjugate driver and mating bearing conjugate of FIG. 14 in two positions of conjugate motion.

FIG. 16 shows the rolling conjugated interaction of the bearing conjugate 246 and the conjugate driver 252. In a first position (indicated by solid lines) the conjugate driver 252 contacts the bearing conjugate 246 at contact area 300. When the conjugate driver 252 has moved into a second position (indicated by dotted lines) the area 304 on the conjugate driver 252 will be in contact with the surface of the conjugate profile of the bearing conjugate 246. The correspondence of contact areas is constant for each iteration of the conjugate drive's motion. That is, for each cycle, there is a repetition of contact area correspondence.

It may be noted that the conjugate drive mechanism of the piston device 210 of FIGS. 6–10 has certain attributes of a wheel, in that it rolls smoothly over a support surface in line-for-line contact, without clearance gaps. It also has attributes of gears, in that the conjugate driver and the bearing conjugate exhibit a repetitive tracking mechanical interaction which prevents slippage. Unlike a gear system there is no tip-to-root clearance or a multiple set of sequentially interrupted contact surfaces. Instead the contact between the conjugate driver and the bearing conjugate is continuous. The conjugate drive also exhibits an increased contact area over either the wheel or the gear. One should further note that the tracking profiles 264, 266 of the conjugate drivers 252, 254 act as self-aligning components as they interface with their respective mating profiles 260, 262 of the bearing conjugates 246, 248.

The bearing conjugates 246, 248 and the conjugate drivers 252, 254 may be formed of hardened steel or other materials as commonly used to form gears and may include surface treatments to reduce wear, friction and production costs (e.g., electroplating, nitriding, spray dispersement and, in general, any known applicable metallurgical or coating process). The weight of the bearing conjugates 260, 262 could be reduced by forming them as a multi-material matrix of aluminum and steel or other metal or non-metal matter. The tracking surfaces of the conjugate drivers 252, 254 may be similarly enhanced by surface treatment or bonding with a friction-reducing bearing material.

It should be noted that the lubrication system described hereinabove maintains a hydrodynamic film of lubricating fluid between the conjugate drivers 252, 254 and the bearing conjugates 246, 248, respectively, producing notable beneficial effects. For instance, the lubrication system not only reduces friction at the interface between the bearing conjugates 246, 248 and the conjugate drivers 252, 254, but also at the interface between the crankpin 242 and conjugate drivers 252, 254. In addition, the lubrication system contributes in minimizing backlash and preventing scuffing by creating a thin hydrodynamic film of lubricating fluid between the bearing conjugates 246, 248 and the conjugate drivers 252, 254, respectively, thereby compensating for inadvertent gaps and spaces resulting from :manufacturing tolerances and/or wear and tear of the conjugate drive mechanism.

It should be apparent that the lubrication system described hereinabove can be configured in various alternative ways. For example, it can be configured in such a way that a quantum of lubricant is injected between the conjugate driver and the bearing conjugate before the area of contact and preferably at a point of low loading. In this way, lubricating fluid will be pushed along in front of the mating interface (i.e., the migrating contact area) through the range of travel. Further, the orifices 274, 276 may extend through the conjugate drivers 252, 254 adjacent an end thereof, rather than intermediate the opposed ends of the conjugate drivers 252, 254 as shown in FIGS. 7–10. The orifices 274, 276 may also communicate with valleys between the undulations of the tracking profiles 264, 266, rather than with their peaks as shown in FIGS. 7–10. Furthermore, the lubrication system can be configured in such a way that a continuous, rather than intermittent, flow of lubricating fluid is provided to the interfaces between the conjugate drivers 252, 254 and the bearing conjugates 246, 248, respectively, or in such a way that the interface between the conjugate driver 252 and the bearing conjugate 246 and the interface between the conjugate driver 254 and the bearing conjugate 248 are lubricated simultaneously, rather than sequentially.

Figure 11:
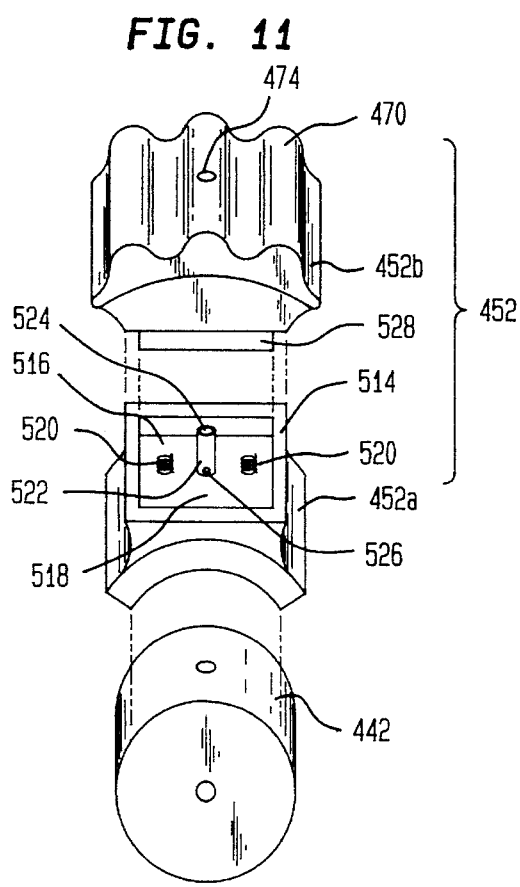
FIG. 11 is an exploded, perspective view of a modified version of the second exemplary embodiment shown in FIGS. 6–10.
Figure 11A:
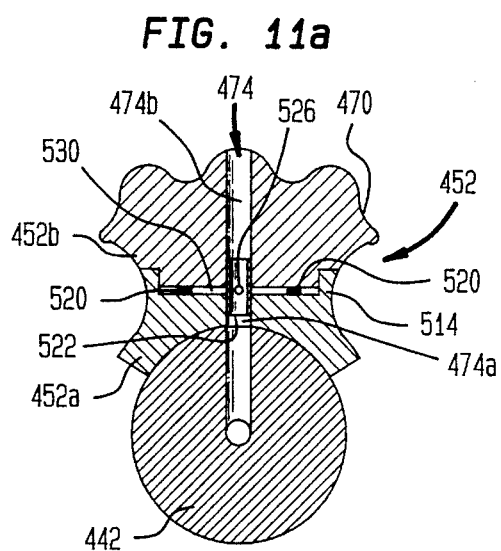
FIG. 11a is a cross-sectional view of the modified version of FIG. 11 in a retracted position.
Figure 11B:
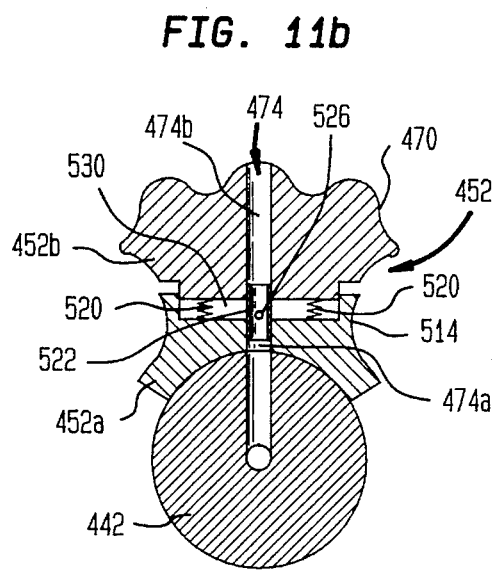
FIG. 11b is a cross-sectional view of the modified version of FIG. 11 in an extended position.

FIGS. 11–11b depict a modified version of the lubrication system illustrated in FIGS. 6–10. In FIGS. 11–11b, a numbering convention is employed wherein elements shown therein having a function or structure in common with a counterpart in previously discussed FIGS. 6–10 are given the same number incremented by two hundred.

Referring to FIGS. 11–11b, a conjugate driver 452 is divided into a lower member 452a and an upper member 452b. The lower member 452a is rotatably mounted on a crankpin 442. The lower member 452a has a peripheral wall 514 which extends beyond an upper surface 516 of the lower member 452a to form a socket 518. Springs 520 and a tubular nipple 522 project from the upper surface 516 within the socket 518 for purposes to be described hereinafter. As can be seen in FIG. 11, the nipple 522, which is fixedly mounted in a lower portion 474a of an orifice 474, includes an axial bore 524 and a plurality of radial holes 526 (only one of which is visible in FIG. 11) whose functions will also be described hereinafter.

The upper member 452b has a solid plug 528 which depends therefrom. The plug 528 has a size and shape which complements those of the socket 518, whereby the plug 528 is slidably received within the socket 518 with sidewalls of the plug 528 being in sealing (i.e., fluid-tight) engagement with the peripheral wall 514 of the lower member 452a. An upper portion 474b of the orifice 474 extends through the upper member 452b, including the plug 528. The upper portion 474b of the orifice 474 is sized and shaped such that it slidably receives the nipple 522 of the lower member 452a (see FIG. 11a).

As can be seen in FIG. 11a, the plug 528 has a height which is slightly less than the depth of the socket 518. Thus, when the plug 528 is in its fully retracted position within the socket 522 as shown in FIG. 11a, the plug 528 does not "bottom out" on the upper surface 516 of the lower member 452a; but, rather, the plug 528 is suspended above the upper surface 516 to create a space 530 which is in communication with the radial holes 526 of the nipple 522 for a purpose to be described hereinafter. The space 530 also accommodates the springs 520, which are fully compressed by the plug 528 when it is in its fully retracted position as shown in FIG. 11a.

As the conjugate driver 452 pivots about the crankpin 442, the springs 520 constantly urge the upper member 452b of the conjugate driver 452 against an associated bearing conjugate (not shown). If the conjugate drive mechanism becomes worn, the springs 520 function to move the upper member 452b from its retracted position depicted in FIG. 11a toward its extended position depicted in FIG. 11b, thereby compensating for such wear and, as a result, reducing backlash and scuffing. As the pressurized lubricating fluid flows from the lower portion 474a of the orifice 474 to the upper portion 474b of the orifice 474 via the nipple 522, a portion of the pressurized lubricating fluid is diverted into the space 530 through the radial holes 526 to thereby assist the springs 520 in urging the upper member 452b against its associated bearing conjugate. To maximize the force of the pressurized lubricating fluid, it may be desirable to provide an annular sealing member (not shown) between the sidewalls of the plug 528 and the peripheral wall 514 of the lower member 452a and/or to provide for a continuous flow of lubricating fluid through the orifice 474 and, hence, to the space 530. Furthermore, the lubrication system can be configured in such a way that a continuous flow of lubricating fluid is supplied to the space 530, while lubricating fluid is intermittently supplied to the interface between the conjugate driver 452 and the associated bearing conjugate. If the lubricating fluid is continuously supplied to the space 530 at a high enough pressure, then the springs 520 could be eliminated.

It should be noted that the relative movement between the upper member 452b and the lower member 452a can be achieved in various ways. For example, magnetic and/or pneumatic means may be employed in conjunction with or instead of the springs 520 and/or the pressurized lubricating fluid (i.e., the hydraulic urging means). Furthermore, the associated bearing conjugate, instead of or in addition to the conjugate driver 452, can be divided into a pair of members, one of which would have a mating profile and would be movable relative to the other member.

It will be understood that the embodiments described herein are merely exemplary and that a person skilled in the art may make many variations and modifications without departing from the spirit and scope of the invention. For example, the present invention can be employed in conjunction with the motion converters disclosed in Brackett U.S. Pat. Nos. 4,590,812 and 4,779,472, provided that such motion converters are equipped with a conjugate drive mechanism as that term is defined herein. All such modifications and variations are intended to be included within the scope of the invention as defined in the appended claims.

I claim:

1. A lubrication system for a conjugate drive mechanism of a scotch yoke type motion converter, comprising a linearly movable shuttle; a crankpin positioned within an aperture in said shuttle and rotatable in a circular path; a bearing conjugate having a trackable profile, which forms a portion of a peripheral boundary of said aperture and which has a first circumferential length; a conjugate driver positioned within said aperture and rotatably mounted about said crankpin, at least a portion of said conjugate driver being located between said crankpin and said bearing conjugate and having a tracking profile, which has a second circumferential length equal to said first circumferential length, said tracking profile and said trackable profile engaging each other continuously in conjugation as said crankpin rotates such that motion is transferable between said crankpin and said shuttle; and conveying means for conveying lubricating fluid from a source of pressurized lubricating fluid to an interface between said tracking profile and said trackable profile.

2. The lubrication system of claim 1, wherein said tracking profile has a continuum of contact lines arranged along the entire circumferential length thereof such that said contact lines serially contact corresponding contact lines on said trackable profile.

3. The lubrication system of claim 2, wherein said trackable profile constitutes a first pitch surface, and said tracking profile constitutes a second pitch surface.

4. The lubrication system of claim 1, wherein said trackable profile constitutes a first pitch surface, and said tracking profile constitutes a second pitch surface.

5. The lubrication system of claim 2, wherein said trackable profile is urged into compression against said tracking profile such that at least some of said contact lines are expanded into contact bands.

6. The lubrication system of claim 5, wherein the width of said contact bands depends upon the compressive loading of said interface between said tracking profile and said trackable profile and the modulus of elasticity of said tracking profile and said trackable profile.

7. The lubrication system of claim 2, wherein the direction and radius of curvature of said tracking profile at said contact lines are similar to the direction and radius of curvature of said trackable profile at said corresponding contact lines.

8. The lubrication system of claim 2, wherein said correspondence of said contact lines of said tracking profiles to said contact lines of said trackable profiles is substantially repeated for each cycle of the motion of said conjugate driver along said bearing conjugate.

9. The lubrication system of claim 1, wherein said tracking profile has a first set of undulations, and said trackable profile includes a second set of undulations, said first set of undulations being in engagement with said second set of undulations.

10. The lubrication system of claim 9, wherein said first set of undulations and said second set of undulations are uniform.

11. The lubrication system of claim 9, wherein there is no tip-root clearance between one of said first set of undulations and a corresponding one of said second set of undulations.

12. The lubrication system of claim 9, wherein the average pitch line of said second set of undulations is concentric with the axis of rotation of said conjugate driver.

13. The lubrication system of claim 9, wherein the average pitch line of said second set of undulations is eccentric with the axis of rotation of said conjugate driver.

14. The lubrication system of claim 1, wherein lubricating fluid introduced to said interface between said tracking profile and said trackable profile serves to increase the effective contact area between said tracking profile and said trackable profile.

15. The lubrication system of claim 1, wherein said trackable profile and said tracking :profile are formed from a chain of arcs swept by corresponding radii having distinct centers of curvature disposed on either side of an associated profile.

16. The lubrication system of claim 1, wherein said conveying means includes a gallery extending in a generally axial direction through said crankpin, said gallery communicating with said source of pressurized lubricating fluid, and a passageway extending through said conjugate driver, said passageway having an inlet provided on a surface of said conjugate driver adjacent to said crankpin and an outlet provided on a surface of said tracking profile adjacent to said bearing conjugate.

17. The lubrication system of claim 16, wherein said conveying means includes a bore provided in a circumferential surface of said crankpin adjacent to said conjugate driver, said bore communicating with said gallery and being alignable with said inlet of said passageway so as to allow lubricating fluid to flow from said gallery to said interface between said tracking profile and said trackable profile as said crankpin rotates.

18. The lubrication system of claim 17, wherein said conjugate driver includes a first portion positioned adjacent to said crankpin and a second portion positioned adjacent to said bearing conjugate, said second portion being movable relative to said first portion toward and away from said bearing conjugate; and wherein said conjugate driver includes urging means for urging said second portion toward said bearing conjugate.

19. The lubrication system of claim 18, wherein said urging means hydraulically urges said second portion toward said bearing conjugate.

20. The lubrication system of claim 19, wherein said conveying means supplies lubricating fluid to a space between said first portion and said second portion such that said second portion is movable relative to said first portion in response to the supply of lubricating fluid to said space.

21. The lubrication system of claim 20, wherein said urging means includes at least one spring positioned between said first portion and said second portion.

22. The lubrication system of claim 18, wherein said urging means includes at least one spring positioned between said first portion and said second portion.

23. The lubrication system of claim 18, wherein said urging means pneumatically urges said second portion toward said bearing conjugate.

24. The lubrication system of claim 18, wherein said urging means magnetically urges said second portion toward said bearing conjugate.

25. The lubrication system of claim 16, wherein said trackable profile includes a first set of undulations, and said tracking profile includes a second set of undulations, said first set of undulations being in engagement with said second set of undulations.

26. The lubrication system of claim 25, wherein said outlet of said passageway is located on a peak of one of the undulations of said second set of undulations.

27. The lubrication system of claim 25, wherein said outlet of said passageway is located between peaks of two adjacent undulations of said second set of undulations.

28. The lubrication system of claim 1, wherein said conveying means conveys lubricating fluid to an interface between said conjugate driver and said crankpin.

29. The lubrication system of claim 28, wherein said conveying means intermittently conveys lubricating fluid to said interface between said tracking profile and said trackable profile.

30. The lubrication system of claim 29, wherein said conveying means continuously conveys lubricating fluid to said interface between said tracking profile and said tracking profile.

31. The lubrication system of claim 1, wherein the conjugate drive mechanism includes a pair of Conjugate drivers rotatably mounted alongside each other on said crankpin and a pair of bearing conjugates formed on opposing portions of said peripheral boundary of said aperture, one of said pair of conjugate drivers including a first tracking profile, which has a circumferential length, and another of said pair of conjugate drivers including a second tracking profile, which has a circumferential length, one of said pair of bearing conjugates including a first trackable profile, which has a circumferential length equal to said circumferential length of said first tracking profile, and another of said pair of bearing conjugates including a second trackable profiles, which has a circumferential length equal to said circumferential length of said second tracking profile, said another bearing conjugate opposing and being offset relative to said one bearing conjugate, said first trackable profile being in engagement with said first tracking profile as said one conjugate driver moves back and forth along said one bearing conjugate, and said second trackable profile being in engagement with said second tracking profile as said another conjugate driver moves back and forth along said another bearing conjugate, whereby motion is continuously transferable between said crankpin and said shuttle through said pair of conjugate drivers and said pair of bearing conjugates.

32. The lubrication system of claim 31, wherein said conveying means includes a gallery extending in a generally axial direction through said crankpin, said gallery communicating with said source of pressurized lubricating fluid, and a pair of passageways, one of said pair of passageways extending through said one conjugate driver and having an inlet provided on a surface of said one conjugate driver adjacent to said crankpin and an outlet provided on a surface of said first tracking profile adjacent to said one bearing conjugate, and another of said pair of passageways extending through said another conjugate driver and having an inlet provided on a surface of said another conjugate driver adjacent to said crankpin and an outlet provided on a surface of said second tracking profile adjacent to said another bearing conjugate.

33. The lubrication system of claim 32, wherein said conveying means includes a pair of bores, one of said pair of bores being provided in a circumferential surface of said crankpin adjacent to said one conjugate driver, and another of said pair of bores being provided in said circumferential surface of said crankpin adjacent to said another conjugate driver, said one bore communicating with said gallery and being alignable with said inlet of said one passageway so as to allow lubricating fluid to flow from said gallery to an interface between said first tracking profile and said first trackable profile as said crankpin rotates, and said another bore communicating with said gallery and being alignable with said inlet of said another passageway so as to allow lubricating fluid to flow from said gallery to an interface between said second tracking profile and said second trackable profile as said crankpin rotates.

34. The lubrication system of claim 31, wherein said first tracking profile has a first continuum of contact lines arranged along the entire circumferential length thereof such that said contact lines serially contact corresponding contact lines on said first trackable profile; and wherein said second tracking profile has a second continuum of contact lines arranged along the entire circumferential length thereof such that said contact lines serially contact corresponding contact lines on said second trackable profile.

35. The lubrication system of claim 34, wherein said first trackable profile is urged into compression against said first tracking profile such that at least some of said contact lines are expanded into contact bands; and wherein said second trackable profile is urged into compression against said second tracking profile such that at least some of said contact lines are expanded into contact bands.

36. The lubrication system of claim 31, wherein said first trackable profile constitutes a first pitch surface, said second trackable profile constitutes a second pitch surface, said first tracking profile constitutes a third pitch surface and said second tracking profile constitutes a fourth pitch surface.

37. The lubrication system of claim 31, wherein lubricating fluid introduced to said interface between said first tracking profile and said first trackable profile serves to increase the effective contact area between said first tracking profile and said first trackable profile; and wherein lubricating fluid introduced to said interface between said second tracking profile and said second trackable profile serves to increase the effective contact area between said second tracking profile and said second trackable profile.

38. The lubrication system of claim 1, wherein the conjugate drive mechanism includes a pair of conjugate drivers and a pair of bearing conjugates formed on opposing portions of said peripheral boundary of said aperture, each of said pair of conjugate drivers being rotatable about said crankpin and independently articulatable through a selected range of degrees, one of said pair of conjugate drivers including a first tracking profile, which has a circumferential length, and another of said pair of conjugate drivers including a second tracking profile, which has a circumferential length, one of said pair of bearing conjugates including a first trackable profile, which has a circumferential length equal to said circumferential length of said first tracking profile, and another of said pair of bearing conjugates including a second trackable profiles, which has a circumferential length equal to said circumferential length of said second tracking profile, said first tracking profile being in engagement with said first trackable profile, and said second tracking profile being in engagement with said second trackable profile, whereby motion is continuously transferable between said crankpin and said shuttle through said pair of conjugate drivers and said pair of bearing conjugates.

39. The lubrication system of claim 38, wherein said conveying means includes a gallery extending in a generally axial direction through said crankpin, said gallery communicating with said source of pressurized lubricating fluid, and a pair of passageways, one of said pair of passageways extending through said one conjugate driver and having an inlet provided on a surface of said one conjugate driver adjacent to said crankpin and an outlet provided on a surface of said first tracking profile adjacent to said one bearing conjugate, and another of said pair of passageways extending through said another conjugate driver and having an inlet provided on a surface of said another- conjugate driver adjacent to said crankpin and an outlet provided on a surface of said second tracking profile adjacent to said another bearing conjugate.

40. The lubrication system of claim 39, wherein said conveying means includes a pair of bores, one of said pair of bores being provided in a circumferential surface of said crankpin adjacent to said one conjugate driver, and another of said pair of bores being provided in said circumferential surface of said crankpin adjacent to said another conjugate driver, said one bore communicating with said gallery and being alignable with said inlet of said one passageway so as to allow lubricating fluid to flow from said gallery to an interface between said first tracking profile and said first trackable profile as said crankpin rotates, and said another bore communicating with said gallery and being alignable with said inlet of said another passageway so as to allow lubricating fluid to flow from said gallery to an interface between said second tracking profile and said second trackable profile as said crankpin rotates.

41. The lubrication system of claim 38, wherein said first tracking profile has a first continuum of contact lines arranged along the entire circumferential length thereof such that said contact lines serially contact corresponding contact lines on said first trackable profile; and wherein said second tracking profile has a second continuum of contact lines arranged along the entire circumferential length thereof such that said contact lines serially contact corresponding contact lines on said second trackable profile.

42. The lubrication system of claim 41, wherein said first trackable profile has a first set of undulations; wherein said second trackable profile has a second set of undulations; wherein said first tracking profile includes a third set of undulations; and wherein said second tracking profile includes a fourth set of undulations, said first set of undulations being in engagement with said third set of undulations, said second set of undulations being in engagement with said fourth set of undulations.

43. The lubrication system of claim 42, wherein there is no tip-root clearance between one of said first set of undulations and a corresponding one of said third set of undulations; and wherein there is no tip-root clearance between one of said second set of undulations and a corresponding one of said fourth set of undulations.

44. The lubrication system of claim 41, wherein said first trackable profile is urged into compression against said first tracking profile such that at least some of said contact lines are expanded into contact bands; and wherein said second trackable profile is urged into compression against said second tracking profile such that at least some of said contact lines are expanded into contact bands.

45. The lubrication system of claim 41, wherein the direction and radius of curvature of said first tracking profile at said contact lines of said first tracking profile are similar to the direction and radius of curvature of said first trackable profile at said corresponding contact lines of said first trackable profile; and wherein the direction and radius of curvature of said second tracking profile at said contact lines of said second tracking profile are similar to the direction and radius of curvature of said second trackable profile at said corresponding contact lines of said second trackable profile.

46. The lubrication system of claim 41, wherein said correspondence of said contact lines of said first tracking profiles to said contact lines of said first trackable profiles is substantially repeated for each cycle of the motion of said one conjugate driver along said one bearing conjugate; and wherein said correspondence of said contact lines of said second tracking profiles to said contact lines of said second trackable profiles is substantially repeated for each cycle of the motion of said another conjugate driver along said another bearing conjugate.

47. The lubrication system of claim 38, wherein said first trackable profile constitutes a first pitch surface, said second trackable profile constitutes a second pitch surface, said first tracking profile constitutes a third pitch surface and said second tracking profile constitutes a fourth pitch surface.

* * * * *

UNITED STATES PATENT AND TRADEMARK OFFICE
CERTIFICATE OF CORRECTION

PATENT NO. : 5,494,135
DATED : February 27, 1996
INVENTOR(S) : Douglas C. Brackett It is certified that error appears in the above-indentified patent and that said Letters Patent is hereby corrected as shown below:

Column 18, line 24, delete "Conjugate" and insert
--conjugate--.

Signed and Sealed this

Twenty-third Day of July, 1996

Attest:

BRUCE LEHMAN

Attesting Officer    Commissioner of Patents and Trademarks